US 6,642,845 B2

(12) United States Patent
Ishiwatari

(10) Patent No.: US 6,642,845 B2
(45) Date of Patent: Nov. 4, 2003

(54) SIGNAL TRANSMITTER AND SIGNAL QUALITY MONITORING DEVICE

(75) Inventor: Junichi Ishiwatari, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 30 days.

(21) Appl. No.: 10/109,327

(22) Filed: Mar. 27, 2002

(65) Prior Publication Data
US 2003/0086369 A1 May 8, 2003

(30) Foreign Application Priority Data
Oct. 29, 2001 (JP) ........................... 2001-331558

(51) Int. Cl.[7] ................................................. G08B 1/08
(52) U.S. Cl. .................. 340/539.21; 340/506; 340/511
(58) Field of Search ................................. 340/635, 657, 340/658, 660, 664, 506, 509, 511, 521, 539.21; 455/15, 18, 67.1, 67.7, 226.4; 370/252, 316, 332; 375/213, 227; 359/110, 158

(56) References Cited

U.S. PATENT DOCUMENTS 5,684,790 A * 11/1997 Hirasawa ............... 370/252
5,754,586 A * 5/1998 Carsello ................. 375/213
6,243,568 B1 * 6/2001 Detlef et al. ............ 455/226.4
6,535,717 B1 * 3/2003 Matsushima et al. ...... 455/18
6,538,779 B1 * 3/2003 Takeshita et al. ......... 359/110

FOREIGN PATENT DOCUMENTS

JP 5037598 2/1993

* cited by examiner

Primary Examiner—Van Trieu
(74) Attorney, Agent, or Firm—Katten Muchin Zavis Rosenman

(57) ABSTRACT

A signal quality monitoring device includes alarm producing/canceling sections for first and second grade, and an alarm holding section for, when a grade of low quality of the current signal shifts from one to the other grades and the corresponding alarm producing/canceling section discriminates that the current signal is in the other grade of low quality, holding the continuous output of the one alarm regardless of the cancellation by the one alarm producing/canceling section, until the other alarm producing/canceling section produces the continuous output of the corresponding other alarm as a consequence of expiration of the corresponding producing time period. Therefore, no-alarm states, caused by frequently shifting of low quality among plural grades in accordance with lengths of a producing time period and a canceling time period set for each grade of low quality, can be avoided.

24 Claims, 10 Drawing Sheets

6,642,845 B2

SIGNAL TRANSMITTER AND SIGNAL QUALITY MONITORING DEVICE

BACKGROUND OF THE INVENTION

1. Field of the Invention

The present invention relates to a signal transmitter and a signal quality monitoring device which are preferably incorporated into an apparatus that monitors signal quality of a received signal and notifies an alarm representing the monitored signal quality to a external apparatus or an apparatus that uses such a alarm as information to switch communication lines (as a switching trigger) More specifically, the present invention relates to a signal quality device that is used for a synchronous network, such as SDH (Synchronous Digital Hierarchy) and SONET (Synchronous Optical NETwork defined by Bellcore and spread in North America).

2. Description of the Related Art

FIG. 6 of the accompanying drawings schematically shows an example of a synchronous network (ring network) in conformity with SDH and SONET. Synchronous network 100 is formed by a plurality of signal transmitters (nodes) A, B, C and D connected in a ring through optical paths (optical fibers) 103. Each of nodes A, B, C and D includes a higher-group apparatus 101 and a lower-group apparatus 102, which are mainly communicably connected by an electric line (e.g., a coaxial cable) 104.

Higher-group apparatus 101 byte-multiplexes a lower-group signal received from lower-group apparatus 102 to create higher-group signals suitable to be transmitted over ring network 100 (among nodes A, B, C and D), and then sent the created higher-group signals out to ring network 100. On the other hand, higher-group apparatus 101 demultiplexes lower-group signals that have been multiplexed into higher-group signals and sends the demultiplexed lower-group signals to lower-group apparatus 102. Lower-group apparatus 102 sends higher-group apparatus 101 lower-group signals that are communicated over a nonillustrated lower-group-side network, and sends the lower-group-side network lower-group signals that have been received from higher-group apparatus 101.

As a result, it is possible to add (lower-group) signals already served over the lower-group network to a higher-group signal communicated over ring network 100 in higher-group apparatus 101, and to drop lower-group signal that is to be sent to lower-group apparatus 102 and to be communicated over the lower-group network from a higher-group signal at higher-group apparatus 101.

In technology of SONET, assuming that a lower-group signal is OC-12 frame (Optical carrier at level 12; an optical transmission frame of approximately 622 Mb/s), a higher-group signal is OC-48 frame (an optical transmission frame of approximately 2.4 Gb/s) in which four OC-12 frames are multiplexed; and assuming that a lower-group signal is OC-48 frame, a higher-group signal is OC-192 frame (an optical transmission frame of approximately 10 Gb/s) in which four OC-48 frames are multiplexed.

Ring network 100 in conformity with SDH and SONET applies technology of APS (Automatic Path Switch) in which signal transmission paths are automatically switched based on a signal quality of a signal transmitted through optical path 103.

For example, higher-group apparatus 101 of one node of the four nodes in FIG. 6 (e.g., node A) transmits two signals identical in contents in two directions of WEST and EAST, respectively. If the transmission signals deteriorate over time and optical path 103 has a problem, higher-group apparatus 101 on the receiver-side node D obtains a quality of each of the transmission signals (a grade of an alarm in accordance with the quality) and selects one of the two transmission signals which is of better quality.

In order to realize the above-mentioned performance, each of nodes A, B, C, and D included in ring network 100 has a function to monitor a quality of a received signal by issuing an alarm and a function for APS. Assuming that an alarm that is issued in accordance with low quality of a signal takes two different grades (importance) each of nodes A, B, C, and D comprises an EAST-side receiving section 111E as a signal monitoring device 200, which includes alarm producing/canceling sections 111a and 111b each for each of the two grade of low quality and a PC (personal computer) 111c, and a WEST-side receiving section 111W identical in configuration with EAST-side receiving section 111E (signal quality monitoring device 200). In addition to the two receiving sections 111E and 111W, each nodes comprises an EAST-side transmitting section 112E including an APS section 113, a WEST-side transmitting section 112W including an APS section 114, and another APS section 115, as shown in FIG. 7 of the accompanying drawings. Thicker lines and thinner lines in FIG. 7 respectively represent communication lines for transmission signals transmitted over ring network 100 and communication lines for alarms and control signals.

In receiving section 111E (signal quality monitoring device 200), alarm producing/canceling circuit 111a discriminates whether a received signal (signal input (1)) is in a corresponding grade of low quality and, when the received signal stays in the corresponding grade for a predetermined producing time period, produces continuous output of an alarm corresponding to the grade of low quality. In the meanwhile, when it is discriminated that the received signal stays off the grade of low quality for a predetermined canceling time period, alarm producing/canceling circuit 111a cancels the continuous output of the alarm.

In the same manner, the other alarm producing/canceling circuit 111b discriminates whether one and the same received signal (signal input (1)) is in a grade of low quality higher than the grade that are discriminated in alarm producing/canceling circuit 111a and, when the received signal stays in the higher grade for another predetermined producing time period, produces continuous output of a higher-grade alarm corresponding to the higher grade of low quality. In the meanwhile, when it is discriminated that the received signal stays off the higher grade of low quality for a predetermined canceling time period, alarm producing/canceling circuit 111b cancels the continuous output of the higher-grade alarm. The lower- and higher-grade alarms will be described in detail later, and coincident outputs of the lower- and higher-grade alarms are not produced.

PC 111c receives results of producing/canceling continuous output of the lower- and the higher-grade alarms from alarm producing/canceling circuits 111a and 111b respectively, and then notifies the received results with respect to states of the alarms to a terminal (not shown in drawings) for system maintenance and provides each of APS sections 113, 114, and 115 with the states of the alarms as APS triggers. Receiving section 111W performs discrimination, and producing/canceling of output of alarms and then provides APS sections 113, 114, and 115 with APS triggers in the same manner performed by receiving section 111E.

Each of APS sections (a receiving signal selector) 113, 114 and 115 receives two signals, which are identical in contents and which are received via EAST direction and WEST direction (i.e., a signal input (1) and a signal input (2)), respectively, and selects (switches) either one of the signal inputs (1) and (2) based on a APS trigger received from PC 111c of receiving section 111E or 111W. One of the two signal input (1) and (2) is previously defied as a "work" and the other as a "protection". If the both signal inputs (1) and (2) stay off the corresponding grades of low quality thereby no alarm is output, APS sections 113, 114, and 115 select a signal input defined as the "work" (in other words, a switching operation to the "work" signal input is carried out). This switching operation is realized by software executed by a CPU.

Hereinafter, operations performed in each of nodes A through D having the above-mentioned configuration will now be described, assuming the signal input (1) (hereinafter also called signal (1)) and the signal input (2) (hereinafter also called signal (2)) as a work and a protection, respectively.

First of all, the signal (1) input into receiving section 111E is further input into APS sections 113, 114, and 115, and the signal (2) input into receiving section 111W is also input into APS sections 113, 114, and 115.

Each of APS sections 113, 114, and 115 switches the signals (1) and (2). Output from APS section 113 becomes a signal output (1); output from APS section 114 becomes a signal output (2); and output from APS section 115 is destined for lower-group apparatus 102.

In signal quality monitoring device 200 in receiving section 111E, alarm producing/canceling circuits 111a and 111b respectively discriminates whether the signal (1) is in the corresponding grade of low quality, and the results (signal quality information) of the discriminating are notified to PC 111c. PC 111c further notifies the signal quality information to a maintenance terminal, and to APS sections 113, 114, and 115 as APS triggers.

Signal quality monitoring device 200 in receiving section 111W also notifies signal quality information to a maintenance terminal, and to APS sections 113, 114, and 115 as APS triggers, likewise the receiving section 111E.

At that time, when alarm producing/canceling circuit 111a in receiving section 111E discriminates that the signal (1) is in the lower grade of low quality, PC 111c provides APS sections 113, 114, and 115 with a switching trigger, respectively. Upon receipt of the switching trigger, each of APS sections 113, 114, and 115 controls a switching operation performed therein so as to select the signal (2).

As mentioned above, in each of nodes A, B, C, and D included in synchronous network 100, APS triggers make APS sections 113, 114, and 115 select an output signal from two signal inputs (1) and (2) based on signal quality information thereby guaranteeing selection for an optical path through which signal of better quality is transmitted.

In a general practice, SONET defines the kinds of alarms that are to be produced/canceled in accordance with grade of low quality as the below table 1 when OC-48 frame is used as a main signal that is to be received by a signal transmitter and Sonet also defines producing time periods and canceling time periods corresponding to the individual alarms.

TABLE 1

Alarm Kinds and Corresponding Alarm Producing/Canceling Time Periods

| GRADE | ALARM LEVEL | ALARM PRODUCING TIME PERIOD | ALARM CANCELING TIME PERIOD |
|---|---|---|---|
| LOW | BER-SD(−6) ALARM | 787.5 ms | 78.75 ms |
|  | BER-SF(−3) ALARM | 7.25 ms | 725 ms |
|  | LOF ALARM | 3 ms OF OOF | 250 µs |
| HIGH | LOS ALARM | 12.5 µs | 100 µs |

A producing time period represents a length of time period that causes continuous output of an alarm when a received signal staying in a grade of low quality corresponding to the output alarm for the producing time period; and a canceling time period represents a length of time period that causes cancellation of the continuous output of the alarm during the continuous output of the alarm when the received signal stays off the grade for the canceling time period.

Namely, output of an alarm is not produced or canceled immediately after discrimination whether a received signal is in or is out of the corresponding grade of low quality, however is produced or canceled after the received signal stays in or stay off the grade for predetermined producing period or canceling period (protection time period), respectively. As an advantage, it is possible to prevent frequent switching between producing and canceling continuous an alarm in a short time period due to shifting of grades of low quality of a received signal from occurring.

BER-SD(−6) in table 1 is an abbreviation for Bit Error Rate Signal Degrade level at 10E−6 that represents the occurrence of one-bit error in 10E6 bits in a received signal; and BER-SF(−3) is an abbreviation for Bit Error Rate Signal Fail level at 10E−3 that represents the occurrence of one-bit error in 10E3 bits of a received signal.

From the fact mentioned above, continuous output of BER-SD(−6) alarm is produced when a received signal stays in BER-SD(−6) of low quality for producing time period (787.5 ms), and the continuous output of BER-SD(−6) alarm is canceled when a state of BER-SD(−6) is restored and the received signal stays off the BER-SD(−6) for the canceling time period (78.75 ms). In the same manner, continuous output of BER-SF(−3) alarm is produced when a received signal stays in BER-SF(−3) of low quality for producing time period (7.25 ms), and the continuous output of BER-SF(−3) alarm is canceled when a state of BER-SF(−3) is restored and the received signal stays off the BER-SF(−3) for the canceling time period (725 ms).

Continuous output of LOF alarm is produced when a received signal (a SONET transmission frame) is in LOF (Loss Of Frame) or OOF (Out Of Frame) for the producing time period (in which it is discriminated that the received signal stays in OOF for 3 ms) in the table; and the continuous output of LOF alarm is canceled when the state of LOF is restored and the received signal stays off the LOF for the corresponding canceling time period (250 µs) during the continuous output of LOF alarm. The producing time period for OOF is 625 µs.

Continuous output of LOS (Loss Of Signal) alarm is produced when signal input is not received for the producing time period (12.5 µs); and the continuous output of LOS alarm is canceled when the signal input is restored to be received and the state of receiving the signal input keeps for the canceling time period in the table during the continuous output of LOS alarm. Among the four kinds of alarms appear in table 1, SONET defines BER-SD(−6) alarm as the lowest and LOS alarm as the highest grades.

A grade of low quality of a received signal can shift among the above-mentioned four grades, however coincident outputs of two or more alarms of different grades cannot be produced. Generally, a higher-grade alarm has a shorter producing time period and a longer canceling time period.

FIG. 8 of the accompanying drawings schematically shows a node in which a function for producing/canceling continuous outputs of the four alarms with different grades is incorporated in receiving section 111E (111W). Namely, receiving section 111E (111W) of each of the nodes A through D comprises a signal quality monitoring device 201, which includes BER-SD(−6)-alarm producing/canceling section 111-1, BER-SF(−3)-alarm producing/canceling section 111-2, LOF-alarm producing/canceling section 111-3, LOS-alarm producing/canceling section 111-4 and PC 111-5. Outputs (signal quality information) from each of alarm producing/canceling sections 111-1 through 111-4 causes PC 111-5 to provide APS sections 113, 114, and 115 with APS triggers, thereby switching optical paths. The other elements and other operations performed in each node are identical with those described with reference to FIG. 7.

In a general practice, transmission capabilities of each optical path 103 is not always constant and changes due to various factors, such as deterioration over time and a problem with the optical path 103. For this reason, results of discrimination with respect to a grade of low quality of a received signal, which discrimination is performed in a receiver-side node (signal quality monitoring device 200 or 201), is not always constant.

For example, when a grade of low quality of a received signal shifts from one grade to the immediate higher grade, the received signal may stay in the immediate higher grade for a relatively long time period, or may frequently shift between the one grade and the immediate higher grade at short-time intervals. In particular, when a sender-side node deteriorates over time, it takes a relatively long time to shift one to another grades of low quality whereupon such frequent shifting among respective different grades inclined to occur.

At that time, signal quality monitoring device 200 or 201 are forced to frequent producing and canceling of continuous outputs of alarms of different grades of low quality by the corresponding alarm producing/canceling sections in a short time period. Therefore, signal quality monitoring device 200 or 201 may output no alarm despite a received signal being in a grade of low quality (hereinafter this disagreement state a "no-alarm state") because of the lengths of producing and canceling time periods set for each grade of low quality.

The occurrence of a no-alarm state will be described with reference to time chart FIG. 9, which illustrates operation carries out in signal quality monitoring device 200 of FIG. 7 (i.e. a received signal takes two grades of low quality).

No alarm states occurs at the time points (i) and (ii) if a grade of low quality of a received signal shifts between the different grades on respective Conditions A and B.

Condition A: the canceling time period for the higher-grade alarm is shorter than the producing time period for the lower-grade alarm;

Condition B: the producing time period for the higher-grade alarm is longer than the canceling time period for the lower-grade alarm.

The producing time period for the lower-grade alarm and the canceling time period for the higher-grade alarm are assumed as Condition A to be 4 ms and 3 ms respectively; and the producing time period for the higher-grade alarm and the canceling time period for the lower-grade alarm are assumed as Condition B to be 2 ms and 1 ms. Under the conditions (especially Condition A), when a grade of low quality of a received signal shifts from the higher grade to the lower grade (at T2 and T4), alarm producing/canceling circuit 111b has already canceled continuous output of the higher-grade alarm (at T21 and T41) due to expiration of the canceling time period (3 ms) until alarm producing/canceling circuit 111a produces continuous output of the lower-grade alarm (at T22 or T42) due to the received signal staying in the lower grade for the producing time period (4 ms) in conformity with Condition A. As a result, no-alarm states occur during time period (i) (T21 through T22 and T41 through T42).

On the other hand, when a grade of low quality of a received signal shifts from the lower grade to the higher grade (at T1 and T3), alarm producing/canceling circuit 111a has already canceled continuous output of the lower-grade alarm (at T11 and T31) due to expiration of the canceling time period (1 ms) until alarm producing/canceling circuit 111b produces continuous output of the higher-grade alarm (at T2 or T4) due to the received signal staying in the higher grade for the producing time period (2 ms) in conformity with Condition B. As a result, no-alarm states occur during time period (ii) (T11 through T2 and T31 through T4).

No-alarm states may occur in signal quality monitoring device 201 of FIG. 8 likewise in the signal quality monitoring device 200. In other words, since the producing and the canceling time period for each of BER-SD(−6) alarm, BER-SF(−3) alarm, LOF alarm and LOS alarm are defined as shown in table 1, the producing time period (787.5 ms) for a lower-grade BER-SD(−6) alarm is longer than the canceling time period (725 ms) for a higher-grade BER-SF(−3) alarm (i.e., sufficing Condition A). As a consequence, when a grade of low quality of a received signal shifts from higher-grade BER-SF(−3) to lower grade BER-SD(−6), a no-alarm state of 62.5 ms (787.5 ms−725 ms) occurs during a time period corresponding to (i) (see reference numbers 301 and 302 in FIG. 10).

Similarly, since the producing time period (7.25 ms) for lower-grade BER-SF(−3) alarm is longer than the canceling time period (250 µs) for higher-grade LOF alarm (i.e., sufficing Condition A), a no-alarm state of 7 ms (7.25 ms−0.25 ms) occurs during time period corresponding to (i) in FIG. 9 (see reference numbers 303 and 304 in FIG. 10) when a grade of low quality of the received signal shifts from higher-grade LOF to lower-grade BER-SF(−3).

Further, since the producing time period (3 ms) for lower-grade LOF alarm is longer than the canceling time period (100 µs) for higher-grade LOS alarm (i.e., sufficing Condition A), a no-alarm state of 2.9 ms (3 ms−0.1 ms) occurs during time period (i) in FIG. 9 (see reference numbers 305 and 306 in FIG. 10) when a grade of low quality of the received signal shifts from higher-grade LOS to lower-grade LOF.

Each of the above three combinations of two different grades does not suffice Condition B (that is, the producing time period (7.25 ms/3 ms/12.5 µs) for the higher-grade alarm is shorter than the canceling time period (78.75 ms/725 ms/250 µs) for the lower-grade alarm). As a consequence, when a grade of low quality of a received signal shifts from a lower grade to a higher grade, continuous outputs of the corresponding higher-grade alarm is produced before continuous output of the corresponding lower-grade alarm is canceled (i.e., the continuous output of the lower-grade alarm is canceled by the producing of continuous output of the higher-grade alarm) whereupon no-alarm states does not occur at the time period corresponding to (ii) in FIG. 9.

Because APS triggers are created at the time when a grade of low quality of a received signal shifts (producing/canceling continuous output of an alarm) the occurrence of no-alarm states creates unnecessary APS triggers (see dotted-line Arrows 307 in FIGS. 9 and 10).

Issued alarms change one after another in a short time due to frequently shifting of a grade of low quality provides APS sections 113, 114, and 115 with a great number of APS triggers. Whereupon, when a CPU executes software to perform switching operations, the load on the CPU may prohibitively increase. Exceeding of the capacity of performance of the CPU may cause freezes on APS sections 113, 114, and 115.

SUMMARY OF THE INVENTION

With the foregoing problems in view, it is an object of the present invention to provide a signal transmitter and a signal quality monitoring device in which a no-alarm state, which has a possibility to occur in accordance with the lengths of a producing time period and a canceling time period for each of alarms of different grades, is prevented from occurring even when a grade of low quality of a received signal shifts from one to another grades.

To attain the above-mentioned object, according to the first generic feature of the present invention, there is provided a signal quality monitoring device for monitoring quality of a signal received by a transmitter and, when the signal is of low quality, selectively issuing one of two alarms with different grades in accordance with a grade of low quality of the signal, comprising: (1) a first-grade alarm producing/canceling section for successively discriminating whether the current signal is in a first grade of low quality and, when the current signal has stayed in the first grade of low quality for a first producing time period, producing continuous output of a first-grade alarm while, when the result of the discriminating becomes negative and the current signal has stayed off the first grade of low quality for a first canceling time period, canceling the continuous output of the first-grade alarm; (2) a second-grade alarm producing/canceling section for successively discriminating whether the current signal is in a second grade of low quality and, when the current signal has stayed in the second grade of low quality for a second producing time period, producing continuous output of a second-grade alarm while, when the result of the discriminating becomes negative and the current signal has stayed off the second grade of low quality for a second canceling time period, canceling the continuous output of the second-grade alarm; and (3) an alarm holding section for, when a grade of low quality of the current signal shifts from one to the other of the first and the second grades and the corresponding one of the first-grade alarm producing/canceling section and the second-grade alarm producing/canceling section has canceled the continuous output of the corresponding alarm as a consequence of expiration of the corresponding canceling time period, if the other of the first-grade alarm producing/canceling section and the second-grade alarm producing/canceling section discriminates that the current signal is in the other grade of low quality, holding the continuous output of the one alarm regardless of the cancellation by the one alarm producing/canceling section, until the other alarm producing/canceling section produces the continuous output of the corresponding other alarm as a consequence of expiration of the corresponding producing time period.

The signal monitoring device, when a grade of low quality of the current signal shifts from one to the other of the first and the second grades and the corresponding one of the first-grade alarm producing/canceling section and the second-grade alarm producing/canceling section has canceled the continuous output of the corresponding alarm as a consequence of expiration of the corresponding canceling time period, if the other of the first-grade alarm producing/canceling section and the second-grade alarm producing/canceling section discriminates that the current signal is in the other grade of low quality, holds the continuous output of the one alarm regardless of the cancellation by the one alarm producing/canceling section, until the other alarm producing/canceling section produces the continuous output of the corresponding other alarm as a consequence of expiration of the corresponding producing time period. As a result, it is possible to prevent the occurrence of a no-alarm state, in which no alarm is output despite the received signal being in either one of the first and the second grades of low quality and which is caused by the lengths of the producing time period and the canceling time period set for each of the first- and the second-grade alarms.

As a preferable feature, the alarm holding section may include: a first alarm holding circuit for, when a grade of low quality of the current signal shifts from the first grade to the second grade and the first-grade alarm producing/canceling section has canceled the continuous output of the first-grade alarm as a consequence of expiration of the first canceling time period, if the second-grade alarm producing/canceling section discriminates that the current signal is in the second grade of low quality, holding the continuous output of the first-grade alarm regardless of the cancellation by the first-grade alarm producing/canceling section, until the second-grade alarm producing/canceling section produces the continuous output of a second-grade alarm as a consequence of expiration the second producing time period; and a second alarm holding circuit for, when a grade of low quality of the current signal shifts from the second grade to the first grade and the second-grade alarm producing/canceling section has canceled the continuous output of the second-grade alarm as a consequence of expiration of the second canceling time period, if the first-grade alarm producing/canceling section discriminates that the current signal is in the first grade of low quality, holding the continuous output of the second-grade alarm regardless of the cancellation by the second-grade alarm producing/canceling section, until the first-grade alarm producing canceling section produces the continuous output of a first grade alarm as a consequence of expiration of the first producing time period.

With the first and the second alarm holding circuits, if the first producing time period is shorter than the second canceling time period, or if the first canceling period is longer than the second producing time period, it is possible to prevent a no-alarm state from occurring as a grade of low quality of the received signal shifts between the first and the second grades of low quality.

As a second generic feature, there is provided a signal transmitter communicably connected to a ring network, comprising: a receiving signal selector for selecting one from two signals, which are identical in contents and which are received by the signal transmitter from two directions of the ring network, based on signal quality information of each of the two signals; a signal quality monitoring section for monitoring quality of the two signals and, when each of the two signals is of low quality, selectively issuing one of two alarms with different grades, as the signal quality information, in accordance with a grade of low quality of the each of the two signals, the signal quality monitoring section, which is identical in construction with the signal quality monitoring device as the first generic feature.

The signal transmitter communicably connected to a ring network, which transmitter that selects one from two signals, which are identical in contents and which are received by the signal transmitter from two directions of the ring network, based on signal quality information of each of the two signals can prevent a no-alarm state from occurring whereupon the receiving signal selector does not have to perform unnecessary selecting operation caused by the occurrence of a no-alarm state.

As a third generic feature, a signal quality monitoring device for monitoring quality of a signal received by a transmitter and, when the signal is of low quality, selectively issuing one of a plurality of alarms with different grades in accordance with a grade of low quality of the signal, comprising: a plurality of producing/canceling sections, associated with the plurality of alarms with different grades respectively, each for successively discriminating whether the current signal is in the corresponding grade of low quality and, when the current signal has stayed in the corresponding grade of low quality for a producing time period, producing continuous output of an alarm of the corresponding grade while, when the result of the discriminating becomes negative and the current signal has stayed off the corresponding grade of low quality for a canceling time period, canceling the continuous output of the alarm of the corresponding grade; an alarm holding section for, when a grade of low quality of the current signal shifts from one to another of the plural alarms with different grades and the corresponding one of the plural alarm producing/canceling sections has canceled the continuous output of the corresponding one of the plural alarms of the plural grades as a consequence of expiration of the corresponding canceling time period, if the corresponding another of the plural alarm producing/canceling sections except the corresponding one alarm producing/canceling section discriminates that the current signal is in the corresponding another grade, holding the continuous output of the one alarm regardless of the cancellation by the corresponding one alarm producing/canceling section, until the another alarm producing/canceling section produces the continuous output of the corresponding another alarm as a consequence of expiration of the corresponding producing time period.

Since such a signal quality monitoring device, which selectively issues one of a plurality of alarms with different grades in accordance with a grade of low quality of the signal, it is possible to avoid a no-alarm state while a grade of low quality of the received signal shifts among the different grades by setting lengths of producing time periods and canceling time periods for alarms corresponding to the different grades of low quality to proper length.

As a fourth generic feature, a signal transmitter communicably connected to a ring network, comprising: a receiving signal selector for selecting one from two signals, which are identical in contents and which are received by the signal transmitter from two directions of the ring network, based on signal quality information of at least one of the two signals; a signal quality monitoring section, provided for the at least one signal, for monitoring quality of the at least one signal and, when the at least one signal is of low quality, selectively issuing one of a plurality of alarms with a plurality of different grades respectively, as the signal quality information, in accordance with a grade of low quality of the at least one signal, which signal quality monitoring section is identical in construction with the signal quality monitoring device of the third generic feature.

Also the last-named signal transmitter communicably connected to a ring network, which transmitter that selects one from two signals, which are identical in contents and which are received by the signal transmitter from two directions of the ring network, based on signal quality information of at least one of the two signals can prevent a no-alarm state from occurring whereupon the receiving signal selector does not have to perform unnecessary selecting operation caused by the occurrence of a no-alarm state.

Since the present invention has the above-mentioned generic and preferable features, it is possible to guarantee the following effective results and advantages:

(1) When a grade of low quality of the current signal shifts from one to the other of the first and the second grades and the corresponding one of the first-grade alarm producing/canceling section and the second-grade alarm producing/canceling section has canceled the continuous output of the corresponding alarm as a consequence of expiration of the corresponding canceling time period, if the other of the first-grade alarm producing/canceling section and the second-grade alarm producing/canceling section discriminates that the current signal is in the other grade of low quality, the continuous output of the one alarm is held regardless of the cancellation by the one alarm producing/canceling section, until the producing time period for the other alarm has been completed. As a result, it is possible to avoid a no-alarm state thereby generating no unnecessary alarms and avoiding unnecessary operations in apparatuses that are activated by the alarms.

(2) Since each alarm holding circuit is in the form of a combination of logical OR circuits and inverters, it is possible to prevent a no-alarm state from occurring by a simple configuration of the circuit.

(3) When the total number of outputs of alarms during a predetermined time period is equal to or greater than a predetermined threshold value whereupon a grade of low quality of the received signal frequently shifts for a short time period, continuous output of either one of the two or the plural alarms is held unless the total number of outputs of alarms during a subsequent predetermined time period becomes smaller than the predetermined threshold value irrespective of a state of shifting of grades of low quality. Therefore, it is further possible to generate no unnecessary alarms and to avoid unnecessary operations in apparatuses that are activated by the alarms.

(4) A signal transmitter, communicably connected to a ring network, selectively receives one from two signals, which are identical in contents and which are received by the signal transmitter from two directions of the ring network, based on signal quality information of each of the two signals whereupon a no-alarm state can be avoided. Further, it is possible to reduce unnecessary data selecting operation thereby minimizing the loads thereon.

Other objects and further features of the present invention will be apparent from the following detailed description when read in conjunction with the accompanying drawings.

DESCRIPTION OF THE PREFERRED EMBODIMENTS

Various preferred embodiments of the present invention will now be described with reference to the accompanying drawings.

(A) First Embodiment:

First of all, a description of the illustrated embodiment will be made assuming that low quality of a received signal includes two grades (i.e., a higher-grade alarm and a lower-grade alarm) for convenience.

Figure 1:
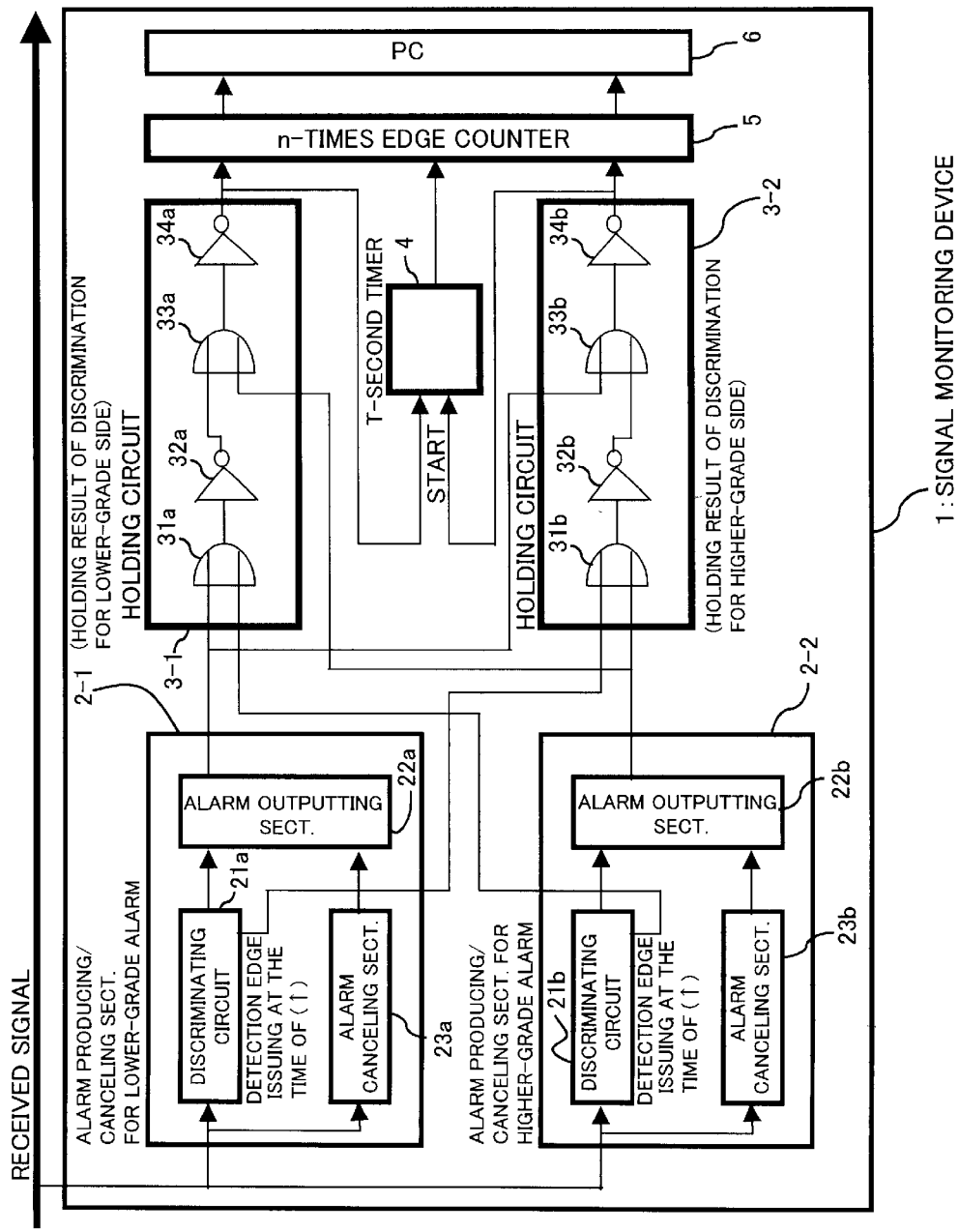
FIG. 1 is a block diagram schematically showing a signal-quality monitoring device according to a first embodiment of the present invention.
Figure 6:
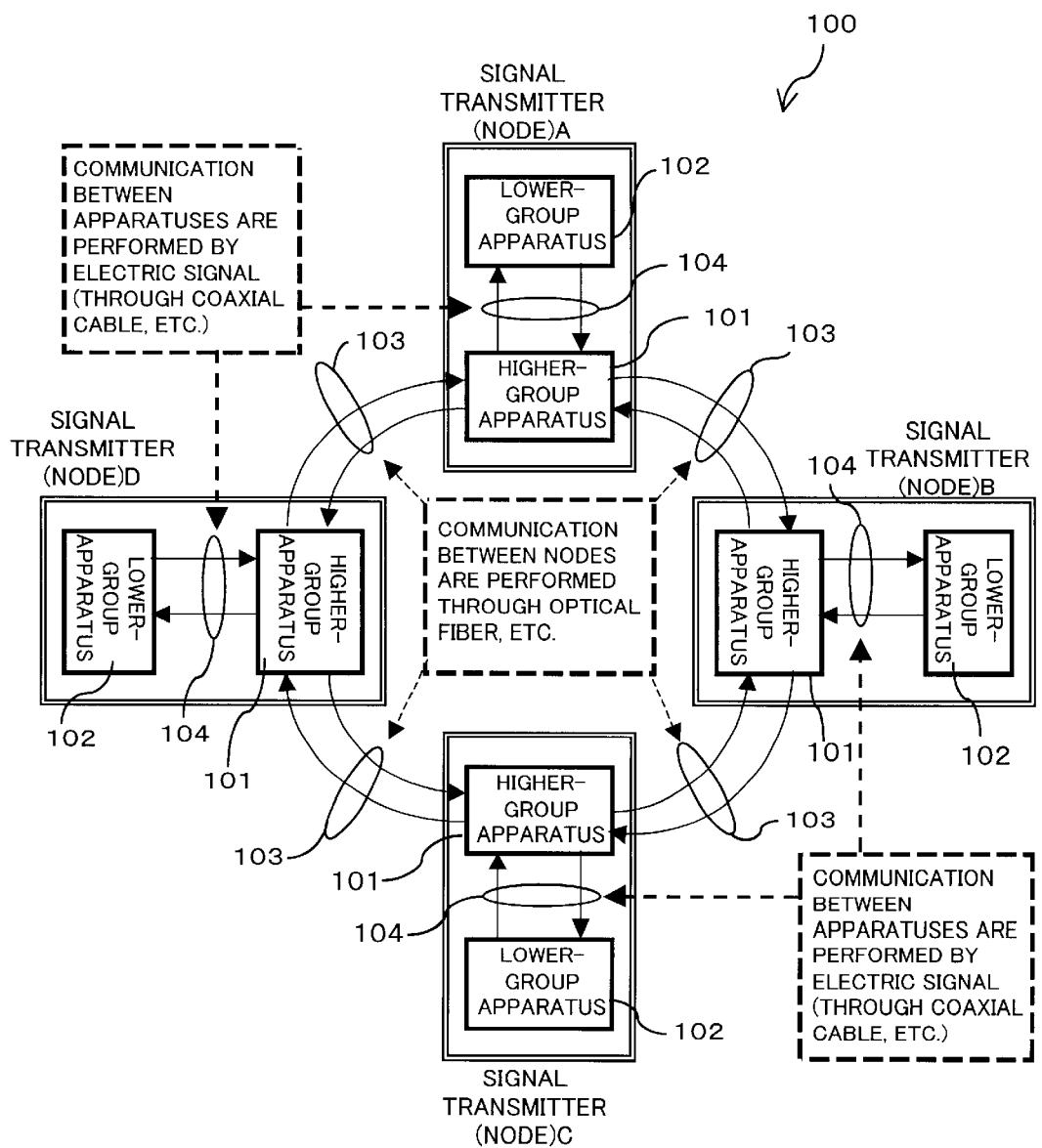
FIG. 6 is a block diagram schematically showing an example of a synchronous network (ring network) conformed to SDH and SONET.

FIG. 1 shows a signal quality monitoring device of the first embodiment, which represents a fundamental of the present invention. Signal quality monitoring device (signal quality monitor) 1 is installed in receiving sections 111E and 111W of higher-group apparatus 101, which has been described with reference to FIGS. 6 and 7, and generates APS triggers (signal quality information), on which each of APS sections (receive selectors) 113, 114 and 115 selectively receives one of two signal identical in contents received from EAST and WEST directions. In the first embodiment, signal quality monitoring device 1 comprises an alarm producing/canceling section 2-1 for the lower-grade alarm, an alarm producing/canceling section 2-2 for the higher-grade alarm, a holding circuit 3-1 for holding continuous output of the lower-grade alarm, a holding circuit 3-2 for holding continuous output of the higher-grade alarm, a T-second timer 4, n-time edge counter 5, and PC 6.

Alarm producing/canceling section (first-grade alarm producing/canceling section) 2-1 successively discriminates whether or not a received signal is in a lower grade of low quality, and produces a continuous output of a lower-grade alarm and cancels the continuous output of the lower-grade alarm based on a result of the discrimination. For that purpose, alarm producing/canceling section 2-1 of the illustrated embodiment comprises a discriminating circuit 21a to discriminate whether a received signal is in the lower grade of low quality, an alarm outputting section 22a to continuously output a lower-grade alarm when the received alarm has stayed in the lower grade for a predetermined producing time period based on the result of the discrimination by discriminating circuit 21a, and an alarm canceling section 23a to discriminate whether or not the received signal is in the lower grade of low quality during the output of the lower-grade alarm and when the received signal has stayed off the lower-grade of low quality for a predetermined canceling time period as a consequence of the discrimination, canceling the continuous output of the lower-grade alarm of alarm outputting section 22a.

Likewise the alarm producing/canceling section 2-1, alarm producing/canceling section (second-grade alarm producing/canceling section) 2-2 comprises a discriminating circuit 21b to discriminate whether a received signal is in the higher grade of low quality, an alarm outputting section 22b to continuously output a higher-grade alarm when the received alarm has stayed in the higher grade for a predetermined producing time period based on the result of the discrimination by discriminating circuit 21b, and an alarm canceling section 23b to discriminate whether or not the received signal is in the higher grade of low quality during the output of the higher-grade alarm and when the received signal has stayed off the higher grade of low quality for a predetermined canceling time period as a consequence of the discrimination, cancel the continuous output of the higher-grade alarm of alarm outputting section 22b.

Each of discriminating circuits 21a and 21b respectively outputs a detection edge ("↑" in the accompanying drawings) upon discriminating that a received signal is in the corresponding lower or higher grades of low quality (i.e., alarm detection time is "0").

Holding circuit (first holding circuit) 3-1 holds the continuous output of the lower-grade alarm, which has been output from alarm producing/canceling section 2-1, until alarm outputting section 22b outputs the higher-grade alarm upon receipt of a detection signal (a detection edge) after the received signal has been in the higher grade of low quality for the predetermined producing time period corresponding to discriminating circuit 21b when alarm canceling section 23a cancels continuous output of the lower-grade alarm due to the received signal staying off the lower grade of low quality of for the predetermined canceling time period and discriminating circuit 21b of alarm producing/canceling section 2-2 for the higher-grade alarm discriminates that the received signal is in the higher grade of low quality.

To realize the above-mentioned holding of continuous output of the lower-grade alarm, holding circuit 3-1 comprises an OR gate (a first logical OR circuit) 31a to output a logical sum of an output for the lower-grade alarm from alarm outputting section 22a and a result of discrimination (a detection edge) by discriminating circuit 21b for the higher-grade alarm, an inverter (a first inverter circuit) 32a to output an invert of the logical sum received from OR gate (a first logical OR circuit) 31a, an OR gate (a second logical OR circuit) 33a to output a logical sum of the invert received from inverter 32a and an output for the higher-grade alarm from alarm outputting section 22b, and an inverter (a second inverter) 34a to output an invert of the logical sum received from OR gate 33a, as shown in FIG. 1.

With such a configuration of holding circuit 3-1, since an output of OR gate 31a keeps an H level (i.e. "1") as long as discriminating circuit 21b in alarm producing/canceling section 2-1 discriminates that a received signal is in the higher grade of low quality even if a continuous output of the lower-grade alarm has been canceled because of the received signal staying off the lower grade of low quality for the canceling time period corresponding to the lower-grade alarm, an output from inverter 32a (i.e., one input to OR gate 33a) is on an L level ("0").

Since an output from OR gate 33a maintains an L level until alarm outputting section 22b outputs the higher-grade alarm (i.e., the other input to OR gate 33a is generated), an output from inverter 34a is on an H level whereupon the continuous output of the lower-grade alarm is held irrespective of the cancellation of a continuous output of the lower grade alarm in alarm producing/canceling section 2-1. As a result, no-alarm states (furthermore a unnecessary APS trigger) at the time (i), which have been described with reference to FIG. 9, can be prevented from occurring.

Holding circuit (second holding circuit) 3-2 holding the continuous output of the higher-grade alarm, which has been output from alarm producing/canceling section 2-2, until alarm outputting section 22a outputs the lower-grade alarm upon receipt of a detection signal (a detection edge) after the received signal has been in the lower grade of low quality for the predetermined producing time period corresponding to discriminating circuit 21a when alarm canceling section 23b cancels continuous output of the higher-grade alarm due to the received signal staying off the higher grade of low quality of for the predetermined canceling time period and discriminating circuit 21a of alarm producing/canceling section 2-1 for the lower-grade alarm discriminates that the received signal is in the lower grade of low quality.

For the identical function with holding circuit 3-1, holding circuit 3-2 is identical in configuration with holding circuit 3-1. Holding circuit 3-2 comprises an OR gate (a third logical OR circuit) 31b to output a logical sum of an output for the higher-grade alarm from alarm outputting section 22b and a result of discrimination (a detection edge) by discriminating circuit 21a for the lower-grade alarm, an inverter (a third inverter circuit) 32b to output an invert of the logical sum received from OR gate 31b, an OR gate (a fourth logical OR circuit) 33b to output a logical sum of the invert received from inverter 32b and an output for the lower-grade alarm from alarm outputting section 22a, and an inverter (a fourth inverter) 34b to output an invert of the logical sum received form OR gate 33b, as shown in FIG. 1.

With such a configuration of holding circuit 3-2, since an output of OR gate 31b keeps an H level (i.e., "1") as long as discriminating circuit 21a in alarm producing/canceling section 2-2 discriminates that a received signal is in the lower grade of low quality even if a continuous output of the higher-grade alarm has been canceled because of the received signal staying off the higher grade of low quality for the canceling time period corresponding to the higher-grade alarm, an output from inverter 32b (i.e., one input to OR gate 33b) is on an L level ("0").

Since an output from OR gate 33b maintains an L level until alarm outputting section 22a outputs the lower-grade alarm (i.e., the other input to OR gate 33b is generated), an output from inverter 34b is on an H level whereupon the continuous output of the lower-grade alarm is held irrespective of the cancellation of a continuous output of the higher-grade alarm in alarm producing/canceling section 2-2. As a result, no-alarm states (furthermore a unnecessary APS trigger) at the time (ii), which have been described with reference to FIG. 9, can be prevented from occurring.

The combination of holding circuits 3-1 and 3-2 serves to function as an alarm holding section to, when a grade of low quality of a received signal shifts from the lower to the higher grades (the higher to the lower grades) so that alarm producing/canceling section 2-1 (2-2) has canceled the continuous output of the lower-grade (higher-grade) alarm as a consequence of expiration of the canceling time period for the lower-grade alarm (the higher-grade alarm), if the alarm producing/canceling section 2-2 (2-1) has not yet produced output of the higher-grade alarm due to non-completion of the producing time period for the higher-grade alarm (the lower-grade alarm), hold the continuous output of the lower-grade alarm regardless of the cancellation by alarm producing/canceling section 2-1 (2-2), until the producing time period for the higher-grade alarm (the lower grade alarm) has been completed.

T-second timer 4 starts providing an n-time edge counter 5 with triggers at T second intervals (at monitoring periods) when holding circuit 3-1 or 3-2 outputs the first alarm (the first H level) and n-time edge counter 5 (hereinafter simply called "counter 5") co-operates with T-second timer 4 to count outputs (detection edges) from holding circuits 3-1 and 3-2 with a single monitoring period and keeps output of one of the lower-grade alarm and the higher-grade alarm based on the result of the counting.

For example, detection edges equal to or more than a threshold value within a single monitoring period holds continuous output of one of the lower-grade alarm and the higher-grade alarm, or detection edges equal to or greater than the threshold value within a single monitoring period holds continuous output of one of the lower-grade alarm and the higher-grade alarm, detection edges of which is more than that of the other alarm. In order to realize the former output of alarm, counter 5 counts the total detection edges irrespective of the respective grades (kinds) of low quality of a signal; and to realize the latter one, counter 5 counts detection edges of each one of the grades of low quality. Such a holding of continuous output of alarm based on the number of detection edges are canceled when the number of detection edges counted within a single monitoring period becomes smaller than the threshold value.

Namely, the combination of T-second timer 4 and counter 5 serves to function as an alarm output controller to obtain the total number of outputs of alarms from holding circuits 3-1 and 3-2 during a predetermined single monitoring period, and to hold, if the obtained number is equal to or greater than a predetermined threshold value, continuous output of one of the lower-grade alarm and the higher-grade alarms unless the number of outputs of alarm from holding circuits 3-1 and 3-2 during a single monitoring period becomes smaller than the threshold value. The function of the alarm output controller is realized by software.

Therefore, when a grade of low quality of a received signal shifts between the lower and the higher grades more frequently than the threshold value within a single monitoring period, holding of continuous output of either one of the lower-grade and the higher-grade alarms can prevent a concentration of switching of alarm outputs (hereinafter called a "disruptive operation") from occurring thereby suppressing unnecessary APS triggers.

Figure 7:
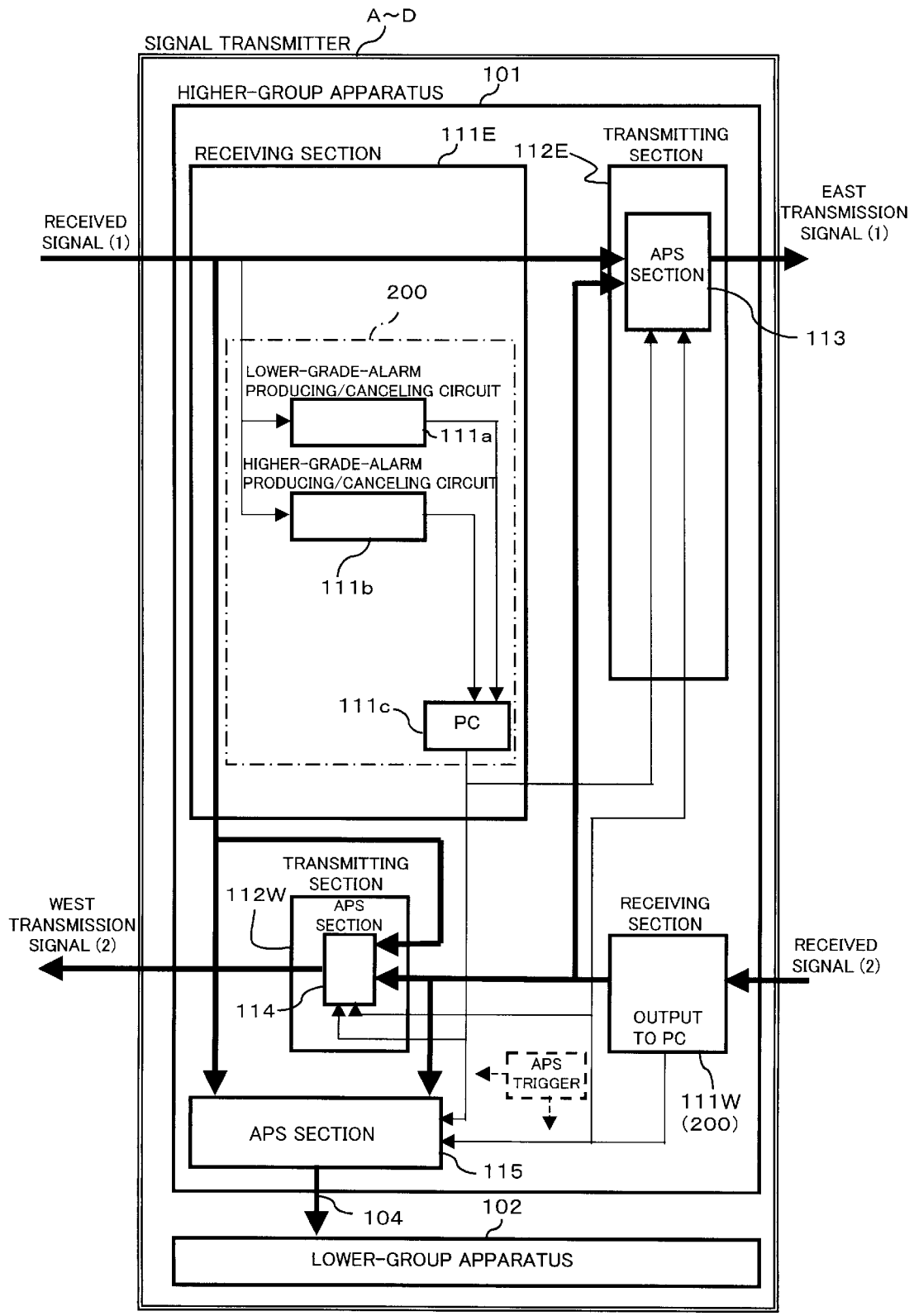
FIG. 7 is a block diagram schematically showing a configuration of a signal transmitter in the synchronous network of FIG. 6.
Figure 8:
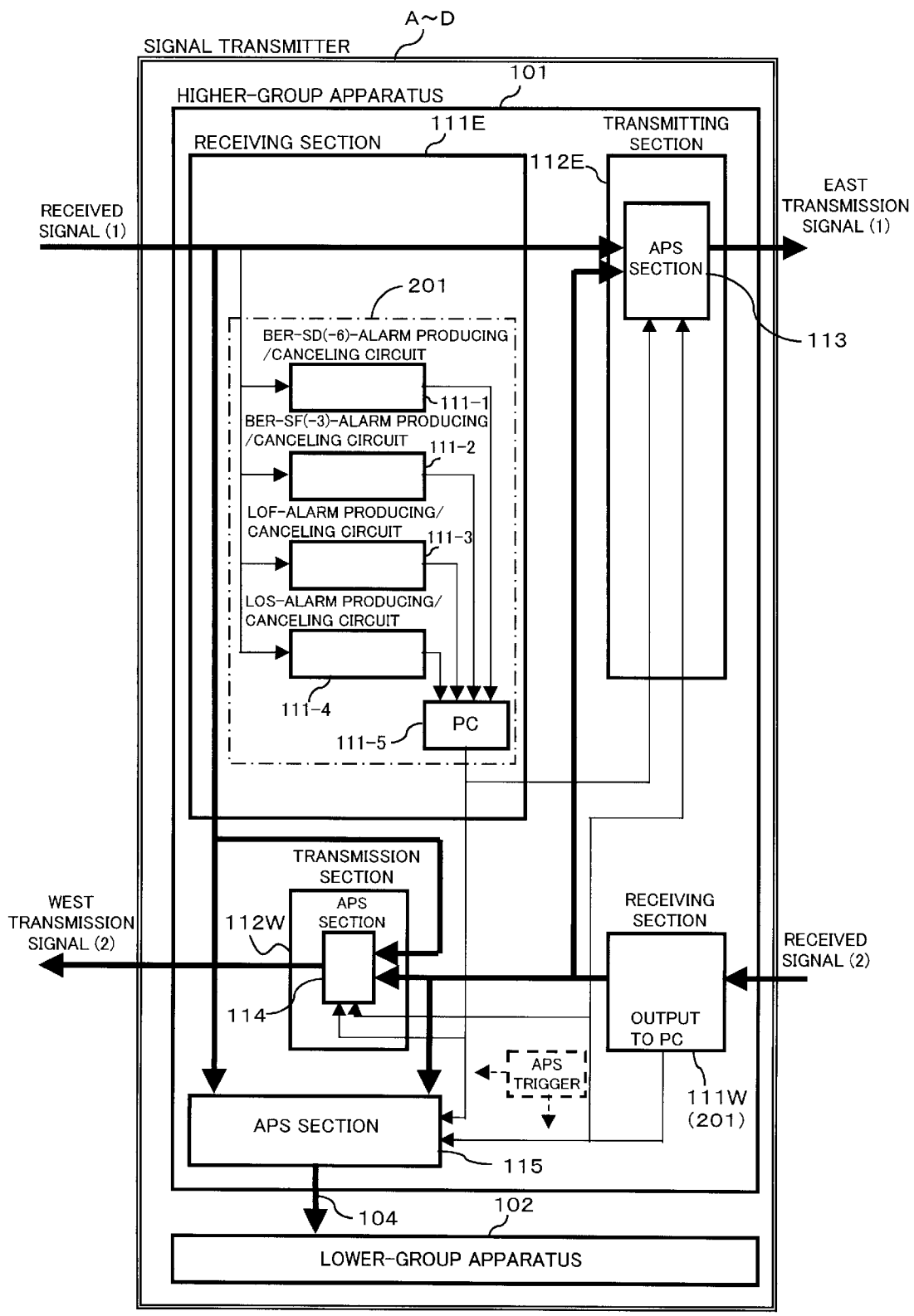
FIG. 8 is a diagram schematically showing various elements of the signal transmitter of FIG. 6.

PC 6 receives outputs (information of discrimination/cancellation) from counter 5 and provides external units (i.e., a terminal for system maintenance or APS sections (receiving signal selector) 113 through 115 in FIGS. 7 and 8) with the received outputs as APS triggers or other usage.

Operations performed in signal quality monitoring device 1 will now be described with reference to time charts FIGS. 2 and 3.

At first, operations performed mainly in alarm producing/canceling sections 2-1 and 2-2 and holding circuits 3-1 and 3-2 are described with reference to FIG. 2.

Figure 2:
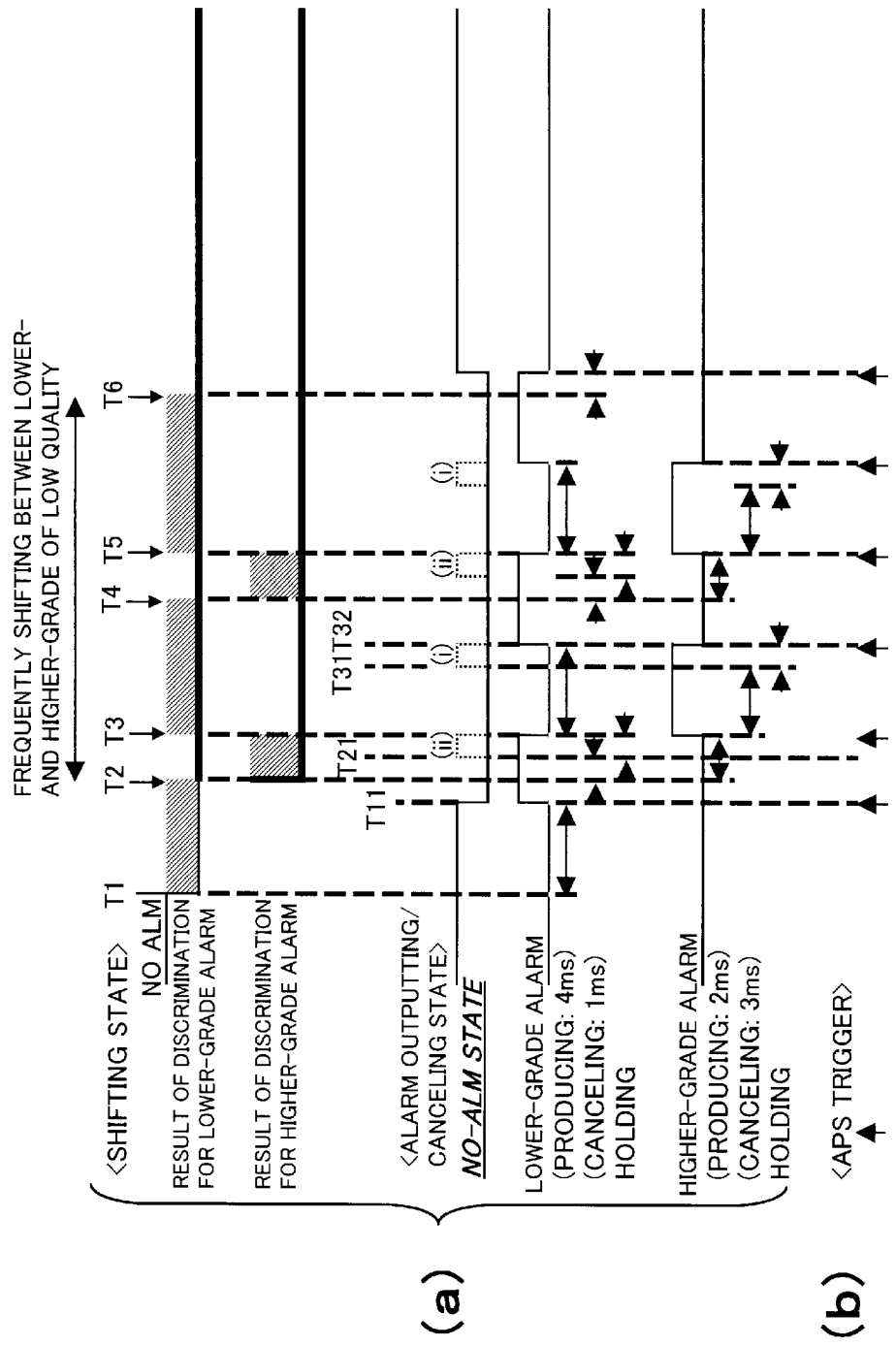
FIGS. 2 and 3 are time charts respectively showing operations performed in the signal-quality monitoring device of FIG. 1.

As shown in FIG. 2, a received signal is in the lower grade of low quality during a time period T1 through T2; in the higher grade during a time period T2 through T3; in the lower grade again during a time period T3 through T4; in the higher grade again during a time period T4 through T5; and in the lower grade again during a time period T5 through T6. For the convenience of comparing with the example of FIG. 9, the producing time period and the canceling time period for the lower-grade alarm (alarm producing/canceling section 2-1) are assumed to be 4 ms and 1 ms, respectively; and the producing time period and the canceling time period for the higher-grade alarm (alarm producing/canceling section 2-2) are assumed to be 2 ms and 3 ms, respectively.

First of all, in signal quality monitoring device 1, discriminating circuit 21*a* of alarm producing/canceling section 2-1 discriminates that a received signal is in the lower grade of low quality at T1 and the received signal has stayed in the lower grade for the corresponding producing time period (4 ms; time period T1 through T11) whereupon alarm outputting section 22*a* produces continuous output of the lower-grade alarm (an H level).

After that, since a grade of low quality of received signal shifts from the lower grade to the higher grade at T2, discriminating circuit 21*a* discriminates that the received signal is no longer in the higher grade of low quality. Subsequently, if the received signal has stayed off the higher grade for the corresponding canceling time period (1 ms), alarm canceling section 23*a* cancels (stops) the continuous output of the lower-grade alarm from alarm outputting section 22*a* (at T21).

At T21, since discriminating circuit 21*b* in the other alarm producing/canceling section 2-2 already discriminates that the received signal is in the higher grade of low quality, an output from OR gate 31*a* of holding circuit 3-1 maintains an H level (in other words, the other input to the OR gate 33*a* of holding circuit 3-1 maintains an L level).

In the meanwhile, since alarm outputting section 22*b* in alarm producing/canceling section 2-2 produces output of the higher-grade alarm (i.e., a states of continuous outputs from alarm outputting section 22*b* becomes an H level) only if the received signal has stayed in the higher grade for the corresponding producing time period (2 ms), both inputs to OR gate 33*a* of holding circuit 3-1 are on L levels whereupon inverter 34*a* holds output of the lower-grade alarm to counter 5 until alarm outputting section 22*b* produces the higher-grade alarm as a consequence of the received signal having stayed in the higher grade of low quality for the corresponding producing time period (2 ms) (i.e., the other input to OR gate 33*a* becomes an H level; T3).

Figure 9:
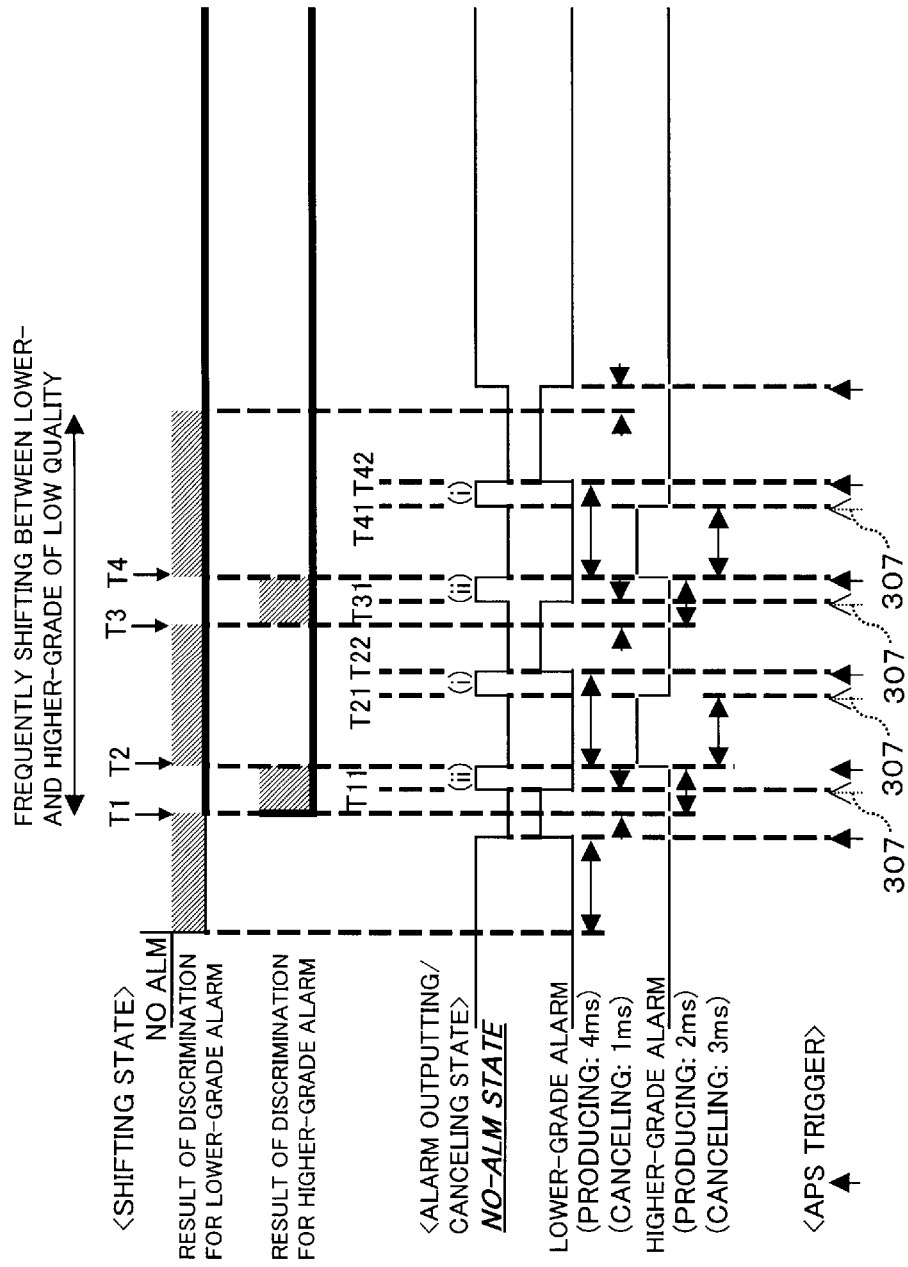
FIGS. 9 and 10 are time charts respectively showing conventional operations performed in a signal-quality of the transmitter of FIGS. 7 and 8.

As a result, it is possible to prohibit no-alarm states, which have occurred at the time (ii) of FIG. 2 in the above-mentioned conventional signal quality monitoring device as shown in FIG. 9.

After that, a grade of low quality of the received signal shifts from the higher grade to the lower grade at T3 whereupon discriminating circuit 21*b* discriminates that the received signal is no longer in the higher grade. In succession, when the received signal has stayed off the higher grade of low quality for the corresponding canceling time period (3 ms) alarm canceling section 23*b* cancels continuous output of the higher-grade alarm, which has been output to holding circuit 3-2 from alarm outputting section 22*b*, at T31.

At the same time (T31), since discriminating circuit 21*a* in the other alarm producing/canceling section 2-1 already discriminates that the received signal is in the lower grade of low quality, an output from OR gate 31*b* of holding circuit 3-2 maintains an H level (in other words, the other input to the OR gate 33*b* of holding circuit 3-2 maintains an L level).

In the meanwhile, since alarm outputting section 22*a* in alarm producing/canceling section 2-1 does not produce a continuous output of the lower-grade alarm (i.e., a states of continuous outputs from alarm outputting section 22*a* maintains an L level) unless the received signal has stayed in the lower grade for the corresponding producing time period (4 ms), both inputs to OR gate 33*b* of holding circuit 3-2 are on L levels whereupon inverter 34*b* holds output of the lower-grade alarm to counter 5 until alarm outputting section 22*a* produces the lower-grade alarm as a consequence of the discrimination by discriminating circuit 21*a* that the received signal has stayed in the higher grade of low quality for the corresponding producing time period (4 ms) (i.e., the other input to OR gate 33*b* becomes an H level; T32).

As a result, it is possible to prohibit no-alarm states, which have occurred at the time (i) of FIG. 2 in the above-mentioned conventional signal quality monitoring device as shown in FIG. 9.

When a grade of low quality of the received signal shifts at the subsequent T4 and T5, signal quality monitoring device 1 performs operations identical with those performed at T2 and T3. Namely, when the received signal is discriminated to be in one of the lower and the higher grades even if the continuous output of the other alarm is canceled, the continuous output of the other alarm are held until continuous output of an alarm corresponding to the one grade is produced. As a result, it is possible to prohibit no-alarm states, which should not occur, however which have occurred in the above-mentioned conventional signal quality monitoring device at the time periods (i) and (ii) of FIG. 2.

As a comparison of FIG. 9 with FIG. 2 shows, the presence of holding circuits 3-1 and 3-2 can prevent unnecessary APS triggers from being generated thereby reducing APS triggers that are generated while shifts in low quality of the received signal frequently occur in a short time period. As an advantage, it is possible to prohibit the occurrence of no-alarm states that is supposed not to occur and generation of unnecessary APS trigger by holding circuits 3-1 and 3-2, which are realized by simple combinations of OR gates 31*a*, 31*b*, 33*a*, 33*b*, and inverters 32*a*, 32*b*, 34*a*, and 34*b*.

When the received signal stays in the lower grade of low quality, since the inputs to OR gates 31*a* and 33*a*, which are received from the higher-grade side, always stay at L levels, holding circuit 3-1 outputs either one of H and L levels in accordance only with a result of discrimination discriminating circuit 21*a* and alarm canceling section 23*a*.

On the other hand, when the received signal stays in the higher grade of low quality, since the inputs to OR gates 31*b* and 33*b*, which are received from the lower-grade side, always stay at L levels, holding circuit 3-2 outputs either one of H and L levels in accordance only with a result of discrimination discriminating circuit 21*b* and alarm canceling section 23*b*.

Operations performed mainly in T-second timer 4 and counter 5 will now be described with reference to FIG. 3. The part (a) in FIG. 3 corresponds to the part (a) of FIG. 2.

First of all, outputs from holding circuits 3-1 and 3-2 are input to T-second timer 4 and n-time edge counter 5. T-second timer 4 is activated by reception of the first edge and provides counter 5 with monitoring triggers 11 that defines the monitoring period at regular monitoring periods of T second (7 ms in the illustrated example; see part (b) FIG. 3). n-time edge counter 5 cooperates with T-second timer 4 to obtain the number of edges (denoted by a symbol "↑" in the accompanying drawing) output from holding circuits 3-1 and 3-2 within a single monitoring period, and sends the obtained number of edges to PC 6.

At that time, counter 5 obtains the number of detection edges of each grade of low quality and further obtains the total number (n) of detection edges output of all grades of low quality. If the total number (n) of detection edges output within a single monitoring period (7 ms) is equal to or greater than a threshold value (e.g., three edges), counter 5 holds (maintains) continuous output of an alarm (the higher-grade alarm in the illustrated example) of a grade which the number of detection edges is smaller than that of the other grades after receipt of the successive monitoring trigger as shown part (c) in FIG. 3. As a result, counter 5 holds continuous output of the higher-grade alarm from the time of T3. Conversely, if the number (n) of detection edges is smaller than the threshold value (i.e., three), counter 5 maintains the immediate prior output (state) of an alarm. For example, counter 5 outputs one or more alarms corresponding to the low quality of the received signal as shown in the parts (a) of FIGS. 2 and 3 that assumes the absence of T-second timer 4.

Figure 3:
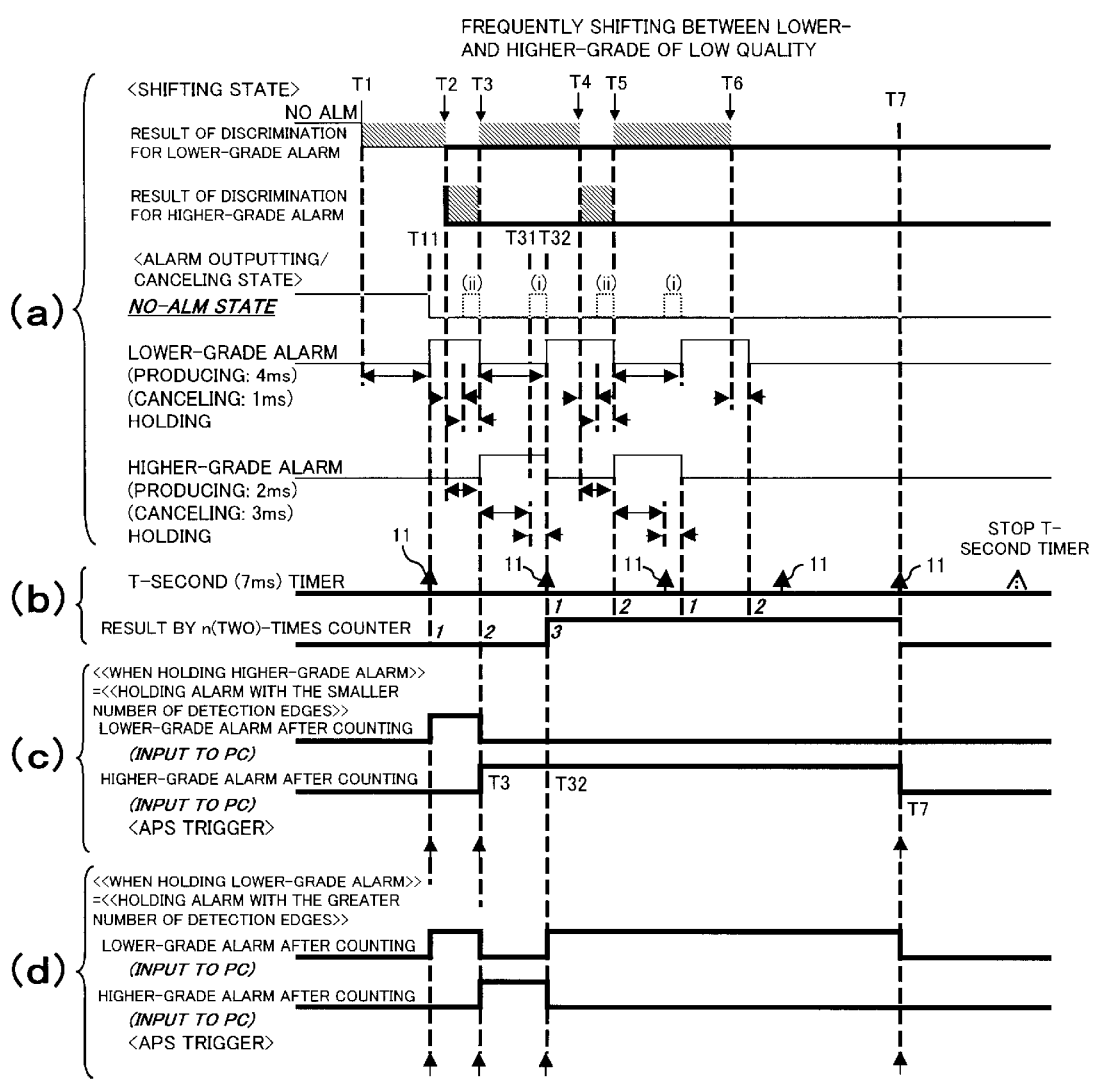

When the number of detection edges within a single monitoring period (7 ms) becomes smaller than two while the continuous output of the higher-grade alarm is held, counter 5 cancels the continuous output of the higher-grade alarm at the time when the single interval expires (e.g., T7 at part (c) in FIG. 3).

With T-second timer 4 and counter 5, it is possible to further reduce APS triggers, which are generated in accordance with shifts in low quality of the received signal, as compared with the number of APS triggers generated prior to process in counter 5 (the part (b) in FIG. 2).

On the other hand, when the total number of detection edges within a single 7 ms monitoring period is equal to or greater than two, counter 5 may hold continuous output of an alarm of which the number of detection edges is greater than that of the other one (the lower-grade alarm in the illustrated example, that is the received signal is in lower grade longer than in the higher grade) as shown in the part (d) of FIG. 3. Also in this case, APS triggers, which are generated in accordance with shifts in low quality of the received signal, are reduced in number as compared with the number of APS triggers generated prior to process in counter 5 (the part (b) in FIG. 2).

Alternatively, when the total number of detection edges within a single 7 ms monitoring period is equal to or greater than three, counter 5 may hold continuous output of the alarm of either one of the lower- and higher-grade alarms regardless of the number of detection edges of each grade of low quality. Also in this case, it is possible to further reduce APS triggers, which are generated in accordance with shifts in low quality of the received signal, as compared with the number of APS triggers generated prior to process in counter 5.

As described above, signal quality monitoring device 1 equipped with holding circuits 3-1 and 3-2 can avoid the occurrence of no-alarm states, in which no alarm is output despite of low quality of the received signal shifting between the lower and the higher grade because of setting for the producing time period and the canceling time period of each grade of low quality.

Therefore, since it is possible to prohibit generation of an unnecessary APS triggers, which are destined for APS sections 113, 114, 115 (FIG. 7), APS sections 113, 114, 115 no more execute needless switching operations thereby reducing loads thereon.

As an further advantage, holding circuits 3-1 and 3-2 that enable to prohibit the occurrence of no-alarm states, are in the form of simple combinations of OR gates and inverters, respectively.

Further, even when a grade of low quality of the received signal frequently sifts between the lower and the higher grades in a short time period, T-second timer 4 and counter 5 hold continuous output of either one of the lower-grade and the higher-grade alarms regardless of shifting of a grade of low quality of the received signal so that a disruptive operation is prevented (in other words, a continuous operation can be kept). It is further possible to prevent unnecessary APS triggers from being generated thereby lightening loads on APS sections 113, 114, and 115.

(B) Second Embodiment:

In the first embodiment, a received signal is assumed to be in two grades of low quality. Here in a second embodiment, a description will be made with respect to the case where a received signal maybe in four grades of "BER-SD(−6)", "BER-SF(−3)", "LOF" and "LOS", which grades are defined by SONET. The four grades are ranked in the order of "BER-SD(−6)", "BER-SF(−3)", "LOF" and "LOS" from the lowest.

Figure 4:
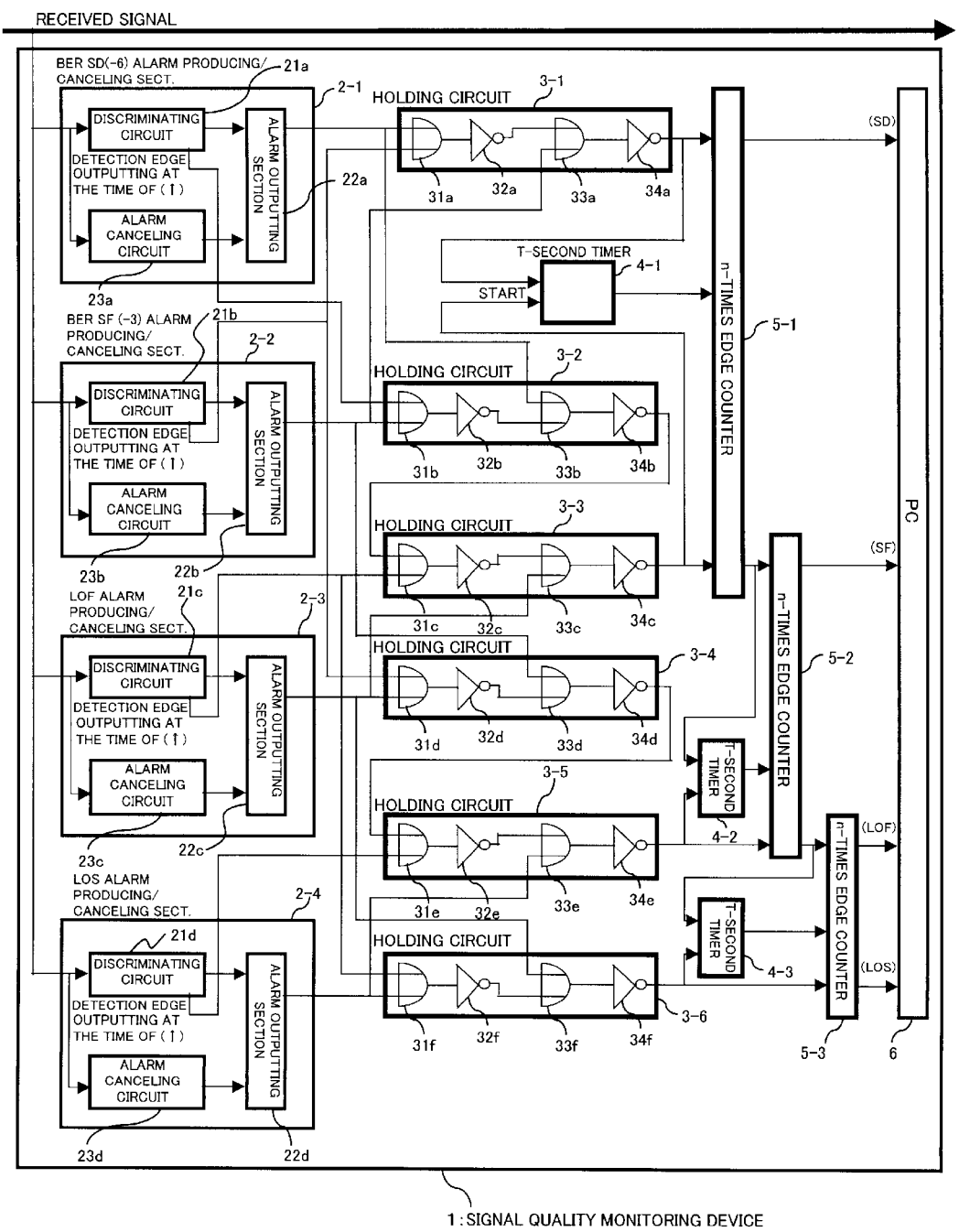
FIG. 4 is a block diagram schematically showing a signal-quality monitoring device according to a second embodiment of the present invention.

FIG. 4 is a block diagram schematically showing signal quality monitoring device 1 that issues alarms with four grades, respectively. As shown in FIG. 4, signal quality monitoring device 1 comprises BER-SD(−6)-alarm producing/canceling section 2-1, BER-SF(−3)-alarm producing/canceling section 2-2, LOF-alarm producing/canceling section 2-3, and LOS-alarm producing/canceling section 2-4, and further comprises holding circuits 3-1 through 3-6, T-second timers 4-1 through 4-3, n-time edge counters 5-1 through 5-3, and PC 6.

As comparing FIG. 4 with FIG. 1, BER-SD(−6)-alarm producing/canceling section 2-1 corresponds to alarm producing/canceling section 2-1 for the lower-level alarm in FIG. 1; and BER-SF(−3)-alarm producing/canceling section 2-2 to alarm producing/canceling section 2-2 for the higher-grade alarm in FIG. 1. LOF-alarm producing/canceling section 2-3 and LOS-alarm producing/canceling section 2-4 are added to signal quality monitoring device 1 for the rest of alarms with two grades.

LOF-alarm producing/canceling section 2-3 and LOS-alarm producing/canceling section 2-4 are identical in construction with BER-SD(−6)-alarm producing/canceling section 2-1 and BER-SF(−3)-alarm producing/canceling section 2-2 as shown in FIG. 4. LOF-alarm producing/canceling section 2-3 includes discriminating circuit 21c, alarm outputting section 22c and alarm canceling section 23c; and LOS-alarm producing/canceling section 2-4 comprises discriminating circuit 21d, alarm outputting section 22d and alarm canceling section 23d.

Holding circuits 3-1 and 3-2 of FIG. 4 are also identical in configuration with those in FIG. 1. T-second timer 4-1 and n-time edge counter 5-1 correspond to T-second timer 4 and n-time edge counter 5 of FIG. 1, respectively. In accordance with the addition of LOF-alarm producing/canceling section 2-3, holding circuit 3-3 is installed downstream of holding circuit 3-2 to hold continuous output of a BER-SF(−3) alarm (an output from BER-SF(−3)-alarm producing/canceling section 2-2), which is the immediately lower grade than a LOF alarm, and holding circuit 3-4 is added in order to hold the continuous output of a LOF alarm (an output from LOF-alarm producing/canceling section 2-3).

In the same manner, in accordance with the addition of LOS-alarm producing/canceling section 2-4, holding circuit 3-5 is installed downstream of holding circuit 3-4 to hold continuous output of a LOF alarm, which is the immediately lower grade than a LOS alarm, and holding circuit 3-6 is added in order to hold the continuous output of a LOS alarm (output from LOS-alarm producing/canceling section 2-4).

Holding circuits 3-3 through 3-6 include, as shown in FIG. 4, OR gates 31c through 31f, inverters 32c through 32f, OR gates 33c through 33f, and inverters 34c through 34f. Holding circuit 3-3 receives an output of holding circuit 3-2 and an output for the LOF alarm from discriminating circuit 21c for the LOF alarm that is the immediate higher grade than the BER-SF(−3) alarm as inputs to OR gate 31c, receives an output from alarm outputting section 22c in LOF-alarm producing/canceling section 2-3 as the other input to OR gate 33c.

Holding circuit 3-4 receives an output from discriminating circuit 21b in BER-SF(−3)-alarm producing/canceling section 2-2 for an BER-SF(−3) alarm, which is the immediately lower grade than a LOF alarm, and an output from alarm outputting section 22c in LOF-alarm producing/canceling section 2-3 as the inputs to OR gate 31d, and receives an output from alarm outputting section 22b in BER-SF(−3)-alarm producing/canceling section 2-2 for an BER-SF(−3) alarm, which is the immediately lower grade than a LOF alarm, as the other input to OR gate 33d.

Further, holding circuit 3-5 receives an output of the holding circuit 3-4 (inverter 34d) and an output from discriminating circuit 21d in LOS-alarm producing/canceling section 2-4 for a LOS alarm as inputs to OR gate 31e, and receives an output from alarm outputting section 22d in LOS-alarm producing/canceling section 2-4 as the other input to OR gate 33e. Holding circuit 3-6 receives an output from discriminating circuit 21c in LOF-alarm producing/canceling section 2-3 for a LOF alarm, which is the immediately lower grade than a LOS alarm, and an output from alarm outputting section 22d in LOS-alarm producing/canceling section 2-4 for a LOS alarm as the outputs to OR gate 31f, and receives an output from 22c in LOF-alarm producing/canceling section 2-3 as the other inputs to OR gate 33f.

T-second timer 4-1 is activated by reception of the first edge (output) from holding circuit 3-1 or holding circuit 3-3 whereupon T-second timer 4-1 issues monitoring triggers 11 at monitoring periods. n-time edge counter 5-1 cooperates with T-second timer 4-1 to obtain the total number of edges output from holding circuits 3-1 and 3-3 within a single monitoring period. If the obtained total number is equal to or greater than a predetermined threshold value, n-time edge counter 5-1 (produces and then) holds output of either one of a BER-SD(−6) alarm and a BER-SF(−3) alarm.

T-second timer 4-2 is activated by reception of the higher-grade output (i.e., a BER-SF(−3) alarm) from n-time edge counter 5-1 or an output from holding circuit 3-5 (i.e., a LOF alarm that is the immediately higher grade than a BER-SF (−3) alarm) thereby starting counting of monitoring periods. n-time edge counter 5-2 cooperates with T-second timer 4-2 to obtain the total number of edges in the form of the higher-grade output from n-time edge counter 5-1 (i.e., the number of outputs of BER-SF(−3) alarm) and edges output from holding circuits 3-5 within a single monitoring period. If the obtained total number is equal to or greater than a predetermined threshold value, n-time edge counter 5-2 (produces and then) holds output of either one of a BER-SF(−3) alarm and a LOF alarm.

T-second timer 4-3 is activated by reception of the higher-grade alarm (i.e., a LOF alarm) output from n-time edge counter 5-2 or an output from holding circuit 3-6 (i.e., a LOS alarm that is the immediately lower grade than a LOF alarm) thereby starting counting of monitoring periods. n-time edge counter 5-3 cooperates with T-second timer 4-3 to obtain the total number of edges in the form of the higher-grade output from n-time edge counter 5-2 (i.e., the number of output LOF alarms) and edges output from holding circuits 3-6 within a single monitoring period. If the obtained total number is equal to or greater than a predetermined threshold value, n-time edge counter 5-3 (produces and then) holds output of either one of a LOF alarm and a LOS alarm.

Namely, combinations of T-second timer 4-i (i=1, 2, or 3) and n-time edge counter 5-i corresponds to the combination of T-second timer 4 and counter 5 of the first embodiment, which serves as the alarm output controller. Signal quality monitoring device 1 of the present embodiment comprises each of the combination for each of two alarms with neighboring or adjacent grades.

With the combinations of T-second timer 4-i and n-time edge counter 5-i, even when low quality of a received signal frequently shifts between "BER-SD(−6)" and "BER-SF(−3)", between "BER-SF(−3)" and "LOF, and between "LOF" and "LOS" in a short time period, it is possible to further prevent no-alarm states from occurring and to reduce APS triggers generated in accordance with shifts between grades of low quality.

Operations performed in signal quality monitoring device 1 of the second embodiment will now be described with reference to time chart FIG. 5. A producing time period and a canceling time period for each grades are defined as above-mentioned table 1.

Figure 5:
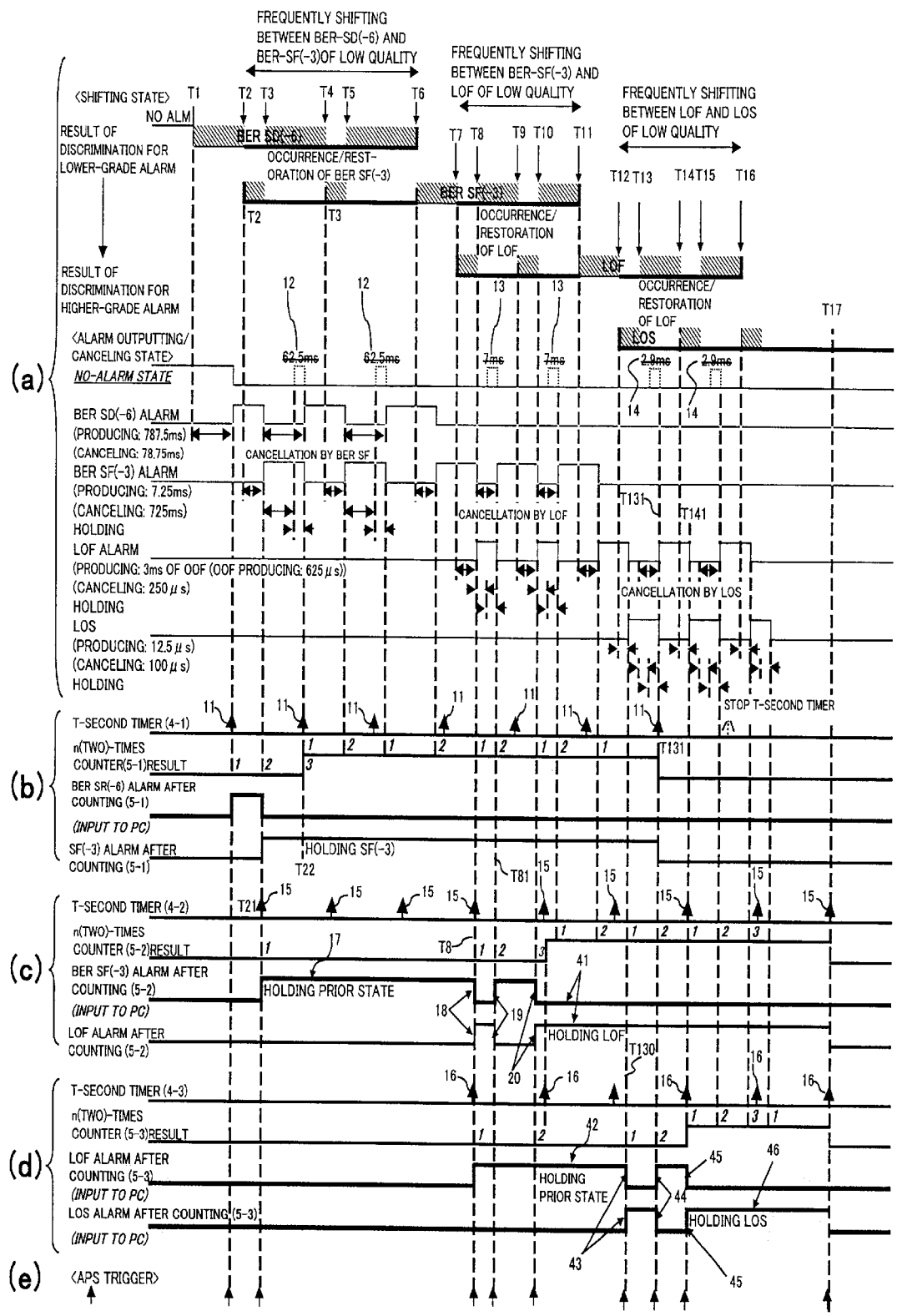
FIG. 5 is a time chart showing operations performed in the signal-monitoring device of FIG. 4.

As shown in FIG. 5, a received signal is in the BER-SD (−6), which is the lowest grade of low quality, during a time period T1 through T2; in the BER-SF(−3), which is the immediate higher grade than BER-SD(−6), during a time period T2 through T3; in the BER-SD(−6) again during a time period T3 through T4; in the BER-SF(−3) again during a time period of T4 and T5; and in the BER-SD(−6) again during a time period T5 through T6. First of all, monitoring of quality of the received signal which quality shifts between BER-SD(−6) as the lower grade and BER-SF(−3) as the higher grade during time period T1 through T6 will be descried.

During this time period, discriminating circuit 21c discriminates that the received signal is not in the "LOF" grade whereupon discriminating circuit 21c and alarm outputting section 22c produces no outputs (i.e., outputs are both on L levels). For that reason, inputs to OR gate 31c and OR gate 33c in holding circuit 3-3 maintain L levels, and therefore inputs to n-time edge counter 5-1 from holding circuit 3-3 is identical with an output from holding circuit 3-2. Namely, when the output from holding circuit 3-2 is on an H level, the output from holding circuit 3-3 is also on an H level; and when the output from holding circuit 3-2 is on an L level, the output from holding circuit 3-3 is also on an L level.

Therefore, operations performed overall by BER-SD(−6)-alarm producing/canceling section 2-1, BER-SF(−3)-alarm producing/canceling section 2-2, and holding circuits 3-1, 3-2 (and 3-3) are substantially identical with those described with reference to FIG. 2. BER-SD(−6)-alarm producing/canceling section 2-1 and BER-SF(−3)-alarm producing/canceling section 2-2 correspond to the first and second alarm producing/canceling sections, respectively, and alarm holding circuits 3-1 through 3-3 overall correspond to the alarm holding section for shifts of low quality between "BER-SD(−6)" and "BER-SF(−3)". More specifically, holding circuit 3-1 serves as the first alarm holding circuit and the combination of holding circuits 3-2 and 3-3 as the second alarm holding circuit.

As shown in the part (a) of FIG. 5, when the low quality of the received signal shifts from the higher grade BER-SF (−3) to the lower grade BER-SD(−6) at T3 and T5 and the received signal stays off BER-SF(−3) for the corresponding canceling time period (725 ms), alarm outputting section 22b of BER-SF(−3)-alarm producing/canceling section 2-2 cancels the continuous output of BER-SF(−3) alarm. At that time, however, since discriminating circuit 21a of BER-SD (−6)-alarm producing/canceling section 2-1 discriminates that the received signal is in BER-SD(−6) of low quality, the H-level output from OR gate 31a of holding circuit 3-1 is held. Until alarm outputting section 22a in BER-SD(−6)-alarm producing/canceling section 2-1 produces continuous output of BER-SD(−6) alarm as a consequence the received signal staying in BER-SD(−6) of low quality for the corresponding producing time period (787.5 ms), the continuous output of BER-SF(−3) alarm of the higher grade is held.

As an advantage, it is possible to prevent a no-alarm state, which has occurred for a time period of 62.5 ms (=787.5 ms−725 ms) denoted by a reference number 12 in FIG. 5, from occurring. In this case, the canceling time period (78.75 ms) for the lowest-grade BER-SD(−6) alarm is longer than the producing time period (7.25 ms) for the higher-grade BER-SF(−3) alarm whereupon a no-alarm state corresponding to that occurs during time period (ii) in FIG. 2 does not occur.

T-second timer 4-1, as shown in the part (b) of FIG. 5, is activated by reception of the first edge (at T2) from holding circuit 3-1 and provides counter 5-1 with monitoring triggers 11 that defines the monitoring periods at regular monitoring periods of T second (7 ms in the illustrated example). n-time edge counter 5-1 cooperates with T-second timer 4-1 to obtain the total number of edges (represented by symbols "↑") output from holding circuits 3-1 and 3-2 (3-3) within a single monitoring period of 7 ms.

When counter 5-1 obtains the number of detection edges within a single monitoring period (7 ms) greater than a threshold value (three), counter 5-1 holds the continuous output of the higher-grade BER-SF(−3) alarm after the time when the subsequent monitoring trigger 11 (at T11) is provided until the number of detection edges within a single monitoring period becomes equal to or smaller than the threshold value (three) (at T131) In the illustrated example, the continuous output of the higher-grade BER-SF(−3) alarm is held after T21.

In other words, when receiving a BER-SD(−6) alarm from holding circuit 3-1 and a BER-SF(−3) alarm from holding circuit 3-3, counter 5-1 avoids the occurrence of a concentration of frequently switching of alarm outputs (hereinafter called a "disruptive operation") due to frequently shifting between BER-SD(−6) and BER-SF(−3) of low quality in a short time period by cooperating with T-second timer 4-1 thereby realizing a continuous output of either one of BER-SD(−6) and BER-SF(−3) alarms (here, the higher-grade BER-SF(−3) alarm).

In the meanwhile, since counter 5-1 outputs the higher-grade BER-SF(−3) alarm to T-second timer 4-2 and counter 5-2 at T21, T-second timer 4-2 is activated as shown in part (c) of FIG. 5 provides counter 5-2 with monitoring triggers 15 that define regular monitoring periods of T second (7 ms in the illustrated example). n-time edge counter 5-2 cooperates with T-second timer 4-2 to obtain the number of edges (represented by symbols "↑") output from the higher-grade side of counter 5-1 (i.e., for BER-SF(−3)) alarm and from holding circuits 3-5 within a single monitoring period of 7 ms.

At that time, since the output for BER-SF(−3) alarm is fixed to H level as shown in the part (c) of FIG. 5 and discriminating circuit 21c of LOF-alarm producing/canceling section 2-3 discriminates that the received signal is not in LOF of low quality, the result of counting of counter 5-2 maintains "1" as a consequence of the first edge received from the higher-grade side BER-SF(−3) of counter 5-1 at T21. Counter 5-2 therefore holds the continuous output of BER-SF(−3) alarm (see Arrow 17).

Here, this example assumes that the received signal is in BER-SF(−3) of low quality again during a time period T6 and T7; in the immediate higher grade LOF during a time period T7 and T8; in BER-SF(−3) again during a time period T8 and T9; in LOF during a time period T9 and T10; in BER-SF(−3) again during a time period T10 and T11; and in LOF again during a time period T11 through T12, as shown in FIG. 5.

During the time period T6 trough T12, the received signal stays off BER-SD(−6) of low quality whereupon discriminating circuit 21a of BER-SD(−6)-alarm producing/canceling section 2-1 discriminates that the received signal is not in BER-SD(−6). Therefore, one input to OR gate 31b of holding circuit 3-2 and one input to OR gate 33b of holding circuit 3-2 are both on L levels and the output of holding circuit 3-2 is therefore identical with the output (H level/L level) of BER-SF(−3)-alarm producing/canceling section 2-2.

For this reason, operations performed by BER-SF(−3)-alarm producing/canceling section 2-2, LOF-alarm producing/canceling section 2-3 and holding circuits 3-2 (3-3) and 3-4 are substantially identical those carried out by alarm producing/canceling sections 2-1 and 2-2 and holding circuit 3-1 and 3-2 described with reference to FIG. 2. Namely, BER-SF(−3)-alarm producing/canceling section 2-2 corresponds to the first-grade alarm producing/canceling section; LOF-alarm producing/canceling section 2-3 to the second-grade alarm producing/canceling section. Holding circuits 3-2, 3-3, and 3-4 serves to function as an alarm holding sections for shift of low quality of a received signal between BER-SF(−3) and LOF. Specifically, holding circuits 3-2 (3-3) and 3-4 corresponds to the first-grade and second-grade holding circuits, respectively.

For example, when the low quality of received signal shifts from the higher-grade LOF to the lower-grade BER-SF(−3) at T8 and T10 and the received signal stays off LOF for the corresponding canceling time period (250 $\mu$s), alarm outputting section 22c of LOF-alarm producing/canceling section 2-3 cancels the continuous output of LOF alarm. At that time, however, since discriminating circuit 21b in BER-SF(−3)-alarm producing/canceling section 2-2 discriminates that the received signal is in BER-SF(−3) of low quality, the H-level output from OR gate 31d of holding circuit 3-4 is held. Until alarm outputting section 22b in BER-SF(−3)-alarm producing/canceling section 2-2 produces continuous output of BER-SF(−3) alarm as a consequence the received signal staying in BER-SF(−3) of low quality for the corresponding producing time period (7.25 ms), the continuous output of the higher-grade LOF alarm is held.

As an advantage, it is possible to prevent a no-alarm state, which has occurred for a time period of 7 ms (=7.25 ms−0.25 ms (250 $\mu$s) denoted by a reference number 13 in FIG. 5, from occurring. In this case, the canceling time period (725 ms) for the lower-grade BER-SF(−3) alarm is longer than the producing time period (3 ms of OOF) for the higher-grade LOF alarm whereupon a no-alarm state corresponding to that occurs during time period (ii) in FIG. 2 does not occur.

T-second timer 4-2, as shown in the part (c) of FIG. 5, is activated again by reception of an edge from holding circuit 3-5 due to of the continuous output of a LOF alarm produced by alarm outputting section 22c of LOF-alarm producing/canceling section 2-3 at T8, and provides counter 5-2 with monitoring triggers 15 at regular monitoring periods of T second (7 ms in the illustrated example). n-time edge counter 5-2 cooperates with T-second timer 4-2 to obtain the total number of edges (represented by symbols "↑") output from the higher-grade side BER-SF(−3) alarm of counter 5-1 and from holding circuits 3-5 within a single monitoring period of 7 ms.

Counter 5-2 holds the continuous output of a BER-SF(−3) alarm (holds the immediate prior output (state) of an alarm) until T8 (see Arrow 17), and however, since output of a higher-grade LOF alarm is produced at T8 as described above, counter 5-2 cancels the continuous output of the BER-SF(−3) alarm continuously outputs the higher-grade LOF alarm at that time (see Arrow 18).

After that, when BER-SF(−3)-alarm producing/canceling section 2-2 discriminates that the received signal is in BER-SF(−3) of low quality and produces continuous output of a BER-SF(−3) alarm (at T81), counter 5-2 continuously outputs the lower-grade alarm BER-SF(−3) and at the same time cancels the higher-grade LOF alarm (see Arrow 19).

Further after that, when LOF-alarm producing/canceling section 2-3 discriminates that the received signal is in LOF of low quality and produces continuous output of a LOF alarm (at T10), counter 5-2 continuously outputs the higher-grade LOF alarm and at the same time cancels the lower-grade BER-SF(−3) alarm (see Arrow 20).

At that time, since the number of detection edges within a single monitoring period (7 ms) already reaches the threshold value (three), counter 5-2 holds the continuous output of, in this example, a LOF alarm without switching of alarm output after the subsequent monitoring trigger 15 is issued unless the number of detection edges within a single monitoring period becomes smaller than the threshold value (three) (at T17) even if low quality of the received signal shifts. Here, continuous output of BER-SF(−3) alarm has been of course canceled (see Arrow 41).

In other words, when receiving a BER-SF(−3) alarm from holding circuit 3-3 via counter 5-1 and a LOF alarm from holding circuit 3-5, counter 5-2 avoids a "disruptive operation" due to frequently shifting between BER-SF(−3) and LOF of low quality in a short time period by cooperating with T-second timer 4-2 thereby realizing a continuous output of either one of BER-SF(−3) and LOF alarms (here, the higher-grade alarm of LOF).

In the meanwhile, T-second timer 4-3 is activated as shown in the part (d) of FIG. 5 when counter 5-2 continuously output the first LOF alarm (see Arrow 18) whereupon T-second timer 4-3 provides counter 5-3 with monitoring triggers 16 that define regular monitoring periods of T second (7 ms in the illustrated example). Counter 5-3 cooperates with T-second timer 4-3 to obtain the total number of edges (represented by symbols "↑") output from the higher-grade side of counter 5-2 for LOF alarm and from holding circuits 3-6 within a single monitoring period of 7 ms.

At that time as shown in the part (d) of FIG. 5, partly since counter 5-2 already holds the continuous output of LOF alarm and partly since the discriminating circuit 21d discriminates that the received signal is not in LOS, the immediate higher grade in low quality however the number of detection edges within a 7 ms single monitoring period is three, counter 5-3 holds the continuous output of LOF alarm (holds the immediate state; see Arrow 42).

In succession, low quality of the received signal shifts from LOF to the immediate higher grade LOS at T12; from LOS to LOF at T13; from LOF to LOS at T14; from LOS to LOF at T15; and from LOF to LOS at T16.

During the time period T12 trough T16, the received signal stays off BER-SF(−3) of low quality whereupon discriminating circuit 21b of BER-SF(−3)-alarm producing/canceling section 2-2 discriminates that the received signal is not in BER-SF(−3). Therefore, one input to OR gate 31d of holding circuit 3-4 and one input to OR gate 33d of holding circuit 3-4 are both on L levels and the output of holding circuit 3-4 is therefore identical with the output (H level/L level) of LOF-alarm producing/canceling section 2-3.

For this reason, operations performed by LOF-alarm producing/canceling section 2-3, LOS-alarm producing/canceling section 2-4 and holding circuits 3-4 (3-5) and 3-6 are substantially identical those carried out by alarm producing/canceling sections 2-1 and 2-2 and holding circuit 3-1 and 3-2 described with reference to FIG. 2. Namely, LOF-alarm producing/canceling section 2-3 corresponds to the first-grade alarm producing/canceling section; LOS-alarm producing/canceling section 2-4 to the second-grade alarm producing/canceling section 2-2. Holding circuits 3-4, 3-5, and 3-6 serves to function as an alarm holding sections for shift of low quality of a received signal between LOF and LOS. Specifically, holding circuits 3-4 (3-5) and 3-6 corresponds to the first-grade and second-grade holding circuits, respectively.

For example, when the low quality of received signal shifts from the higher-grade LOS to the lower-grade LOF at T13 and T15 and the received signal stays off LOS for the corresponding canceling time period (100 μs), alarm outputting section 22d of LOS-alarm producing/canceling section 2-4 cancels the continuous output of LOS alarm. At that time, however, since discriminating circuit 21c in LOF-alarm producing/canceling section 2-3 discriminates that the received signal is in LOF of low quality, the H-level output from OR gate 31f of holding circuit 3-6 is held. Until alarm outputting section 22c in LOF-alarm producing/canceling section 2-3 produces continuous output of LOF alarm as a consequence the received signal staying in LOF of low quality for the corresponding producing time period (3 ms of OOF), the continuous output of the higher-grade LOS alarm is held.

As an advantage, it is possible to prevent a no-alarm state, which has occurred for a time period of 2.9 ms (=3 ms−0.1 ms (100 μs) denoted by a reference number 14 in FIG. 5, from occurring. In this case, the canceling time period (250 ms) for lower-grade LOF alarm is longer than the producing time period (12.5 μs) for the higher-grade LOF alarm whereupon a no-alarm state corresponding to that occurs during time period (ii) in FIG. 2 does not occur.

T-second timer 4-3, as shown in the part (d) of FIG. 5, is activated again by reception of an edge from holding circuit 3-6 due to the continuous output of a LOS alarm produced by alarm outputting section 22d of LOS-alarm producing/canceling section 2-4 at T130 and provides counter 5-3 with monitoring triggers 16 at regular monitoring period s of T second (7 ms in the illustrated example). Counter 5-3 cooperates with T-second timer 4-3 to obtain the total number of edges (represented by symbols "↑") output from the higher-grade side (i.e., LOS alarm) of counter 5-2 and from holding circuits 3-6 within a single monitoring period of 7 ms.

Counter 5-3 holds the continuous output of a LOF alarm (holds the immediate prior output (state) of an alarm) until T130 (see Arrow 42) as described above, and however, since output of a higher-grade LOS alarm is produced as described above, counter 5-3 cancels the continuous output of the LOF alarm continuously outputs the higher-grade LOS alarm (see Arrow 43).

After that, when LOF-alarm producing/canceling section 2-3 produces continuous output of a LOF alarm (at T131) as a result of discrimination with respect to the received signal in discriminating circuit 21c, counter 5-3 continuously outputs the lower-grade LOF alarm and at the same time cancels the higher-grade LOS alarm (see Arrow 44).

Further after that, when LOS-alarm producing/canceling section 2-4 discriminates that the received signal is in LOS of low quality and produces continuous output of a LOS alarm (at T141 in the part (a) of FIG. 5), counter 5-3 continuously outputs the higher-grade LOS alarm and at the same time cancels the lower-grade LOF alarm (see Arrow 45).

At that time, since the number of detection edges within a single monitoring period (7 ms) already reaches the threshold value (three), counter 5-3 holds the continuous output of a LOS alarm without switching of alarm output after the subsequent monitoring trigger 16 is issued unless the number of detection edges within a single monitoring period becomes smaller than the threshold value (three) (at T17) even if low quality of the received signal shifts. Here, continuous output of LOF alarm has been of course canceled (see Arrow 46).

In other words, when receiving a LOF alarm from holding circuit 3-5 via counter 5-2 and a LOS alarm from holding circuit 3-6, counter 5-3 avoids a "disruptive operation" due to frequently shifting between LOF and LOS of low quality in a short time period by cooperating with T-second timer 4-3 thereby realizing a continuous output of either one of LOF and LOS alarms (here, the higher-grade LOS alarm).

Figure 10:
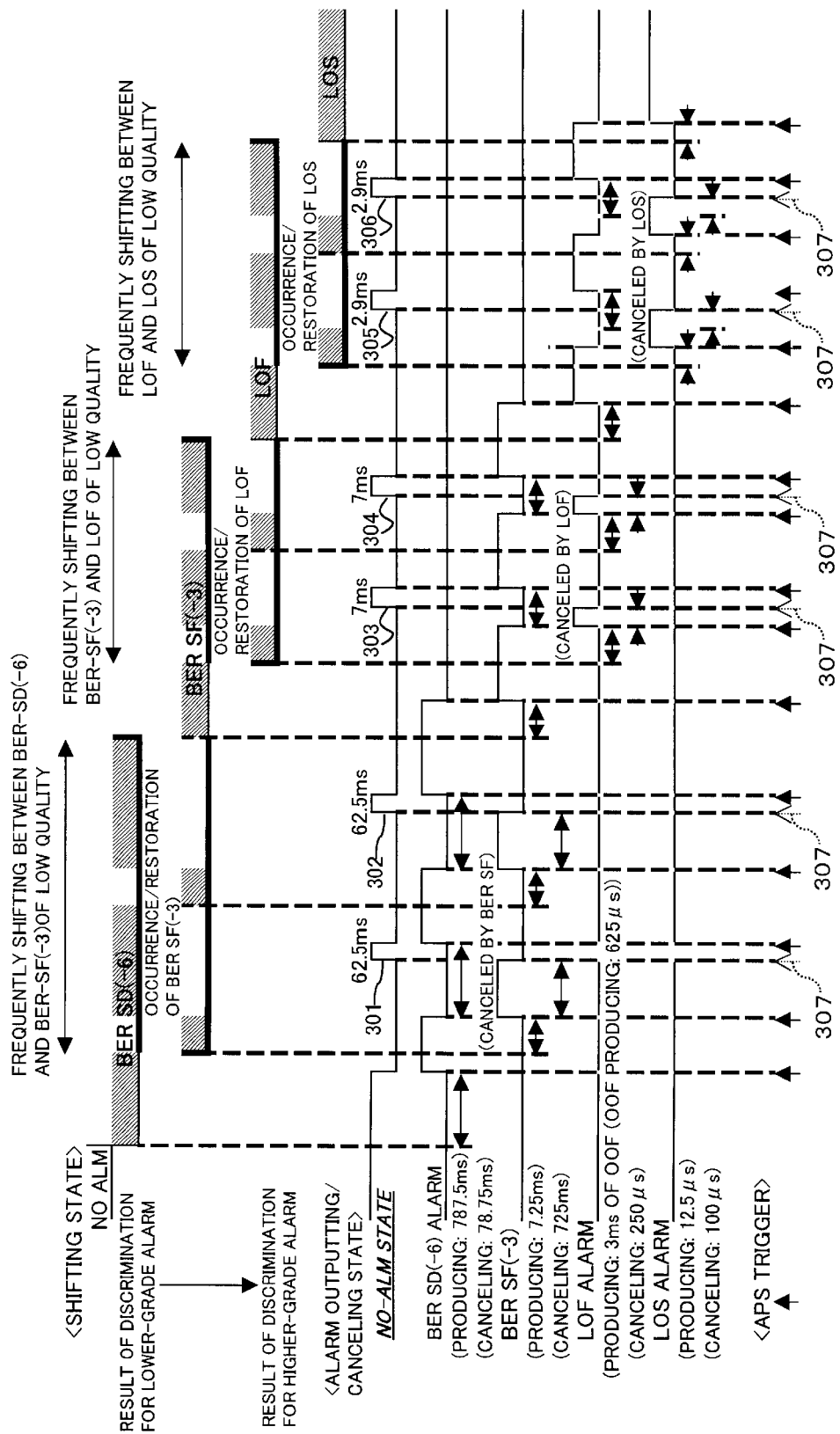

When the number of detection edges within a single monitoring period obtained by each of T-second timers 4-1, 4-2 and 4-3 is smaller than three (the threshold value), each of counters 5-1, 5-2, and 5-3 that are corresponding to each of T-second timers 4-1, 4-2 and 4-3 outputs the immediate prior output of an alarm (holds the immediate prior state). On the other hand, when the number of detection edges is equal to or greater than three, each corresponding counter 5-1, 5-2 or 5-3 holds the continuous output of the higher-grade (or lower-grade) alarm. If the number of detection edges within a single monitoring period becomes smaller than three during the continuous output of the higher-grade (or lower-grade) alarm is held, each corresponding counter 5-1, 5-2 or 5-3 cancels the holding of the continuous output thereby, as shown in part (e) of FIG. 5, greatly reducing APS triggers as comparing with the conventional manner described with reference to FIG. 10.

(C) Others:

In the above-mentioned second embodiment, since a producing time period for a higher-grade alarm is shorter than a canceling time period for a lower-grade alarm regarding all combinations of two successive grades of low quality among the four grades, no-alarm state corresponding to the no-alarm states (ii) of FIG. 2 does not occur. However, if a producing time period for a higher-grade alarm is longer than a canceling time period for a lower-grade alarm, it is also possible to avoid the occurrence of no-alarm states and to reduce APS triggers as using signal quality monitoring device 11 of FIG. 4.

Holding of continuous output of a higher-grade alarm is performed in the second embodiment when the number of detection edges within a single monitoring period (7 ms) is equal to or greater than three. Alternatively, a lower-grade alarm may be held, or a held alarm may be decided based on the of detection edges of each of the lower- and higher-grade alarms as describing the first embodiment.

Of course, a length of the monitoring period (7 ms) and the threshold value of detection edges may be changed as required.

Signal quality monitoring device of the first and the second embodiments can prevent no-alarm states occurs at the time represented by (i) and (ii) in FIG. 2 (i.e., signal quality monitoring device 1 is equipped with the first and the second holding circuits). As an alternative, signal quality monitoring device 1 may prevents no-alarm states occur at the time either one of (i) and (ii) (i.e., signal quality monitoring device 1 may be equipped with one of the first and the second holding circuits).

Throughout the specification, signal quality monitoring device 1 is incorporated in a SONET (SDH) transmitter. However signal quality monitoring device 1 can be incorporated in any-kind transmitter which receives a signal that is in various grades of low quality and in which no-alarm states occurs based on time length set as a producing time period and a canceling time period for each of the various grades of low quality.

Further, the present invention should by no means be limited to these foregoing embodiments, and various changes or modifications may be suggested without departing from the gist of the invention.

What is claimed is:

1. A signal quality monitoring device for monitoring quality of a signal received by a transmitter and, when the signal is of low quality, selectively issuing one of two alarms with different grades in accordance with a grade of low quality of the signal, comprising:

a first-grade alarm producing/canceling section for successively discriminating whether the current signal is in a first grade of low quality and, when the current signal has stayed in the first grade of low quality for a first producing time period, producing continuous output of a first-grade alarm while, when the result of the discriminating becomes negative and the current signal has stayed off the first grade of low quality for a first canceling time period, canceling the continuous output of the first-grade alarm;

a second-grade alarm producing/canceling section for successively discriminating whether the current signal is in a second grade of low quality and, when the current signal has stayed in the second grade of low quality for a second producing time period, producing continuous output of a second-grade alarm while, when the result of the discriminating becomes negative and the current signal has stayed off the second grade of low quality for a second canceling time period, canceling the continuous output of the second-grade alarm; and an alarm holding section for, when a grade of low quality of the current signal shifts from one to the other of the first and the second grades and the corresponding one of said first-grade alarm producing/canceling section and said second-grade alarm producing/canceling section has canceled the continuous output of the corresponding alarm as a consequence of expiration of the corresponding canceling time period, if the other of said first-grade alarm producing/canceling section and said second-grade alarm producing/canceling section discriminates that the current signal is in the other grade of low quality, holding the continuous output of the one alarm regardless of the cancellation by said one alarm producing/canceling section, until the other alarm producing/canceling section produces the continuous output of the corresponding other alarm as a consequence of expiration of the corresponding producing time period.

2. A signal quality monitoring device according to claim 1, said alarm holding section including a first alarm holding circuit for, when a grade of low quality of the current signal shifts from the first grade to the second grade and said first-grade alarm producing/canceling section has canceled the continuous output of the first-grade alarm as a consequence of expiration of the first canceling time period, if said second-grade alarm producing/canceling section discriminates that the current signal is in the second grade of low quality, holding the continuous output of the first-grade alarm regardless of the cancellation by said first-grade alarm producing/canceling section, until said second-grade alarm producing/canceling section produces the continuous output of a second-grade alarm as a consequence of expiration the second producing time period.

3. A signal quality monitoring device according to claim 2, wherein said first alarm holding circuit including:
   a first logical OR circuit for outputting a logical sum of a state of the continuous output of the first-grade alarm from said first-grade alarm producing/canceling section and a result of the discriminating in said second-grade alarm producing/canceling section;
   a first inverter circuit, connected to said first logical OR circuit, for outputting a first invert of the logical sum received from said first logical OR circuit;
   a second logical OR circuit, connected to said first inverter circuit, for outputting a logical sum of the first invert received from said first inverter circuit and a state of the continuous output of the second-grade alarm from said second-grade alarm producing/canceling section; and
   a second inverter circuit, connected to said second logical OR circuit, for outputting a second invert of the logical sum received from said second logical OR circuit.

4. A signal quality monitoring device according to claim 3, further comprising an alarm output controller for obtaining the total number of outputs of alarms from said first alarm holding circuit and said second alarm holding circuit during a predetermined time period, and for holding, if the obtained total number is equal to or greater than a predetermined threshold value, continuous output of one of the first-grade alarm and the second-grade alarm unless the total number of outputs of alarms from said first alarm holding circuit and said second alarm holding circuit during the predetermined time period becomes smaller than the threshold value.

5. A signal quality monitoring device according to claim 4, wherein said alarm output controller obtains the number of outputs of alarms from each one of said first alarm holding circuit and said second alarm holding circuit, and holds the continuous outputs of one of the first-grade alarm and the second-grade alarm based on the result of a comparison of the obtained number of outputs of alarms from each of the first alarm holding circuit and the second alarm holding circuit.

6. A signal quality monitoring device according to claim 1, said alarm holding section including a second alarm holding circuit for, when a grade of low quality of the current signal shifts from the second grade to the first grade and said second-grade alarm producing/canceling section has canceled the continuous output of the second-grade alarm as a consequence of expiration of the second canceling time period, if said first-grade alarm producing/canceling section discriminates that the current signal is in the first grade of low quality, holding the continuous output of the second-grade alarm regardless of the cancellation by said second-grade alarm producing/canceling section, until said first-grade alarm producing canceling section produces the continuous output of a first grade alarm as a consequence of expiration of the first producing time period.

7. A signal quality monitoring device according to claim 6, wherein said second alarm holding circuit including:
   a third logical OR circuit for outputting a logical sum of a state of the continuous output of the second-grade alarm from said second-grade alarm producing/canceling section and a result of the discriminating in said first-grade alarm producing/canceling section;
   a third inverter circuit, connected to said third logical OR circuit, for outputting a third invert of the logical sum received from said third logical OR circuit;
   a fourth logical OR circuit, connected to said third inverter circuit, for outputting a logical sum of the third invert received from said third inverter circuit and a state of the continuous output of the first-grade alarm from said first-grade alarm producing/canceling section; and
   a fourth inverter circuit, connected to said fourth logical OR circuit, for outputting a fourth invert of the logical sum received from said fourth logical OR circuit.

8. A signal quality monitoring device according to claim 7, further comprising an alarm output controller for obtaining the total number of outputs of alarms from said first alarm holding circuit and said second alarm holding circuit during a predetermined time period, and for holding, if the obtained total number is equal to or greater than a predetermined threshold value, continuous output of one of the first-grade alarm and the second-grade alarm unless the total number of outputs of alarms from said first alarm holding circuit and said second alarm holding circuit during the predetermined time period becomes smaller than the threshold value.

9. A signal quality monitoring device according to claim 8, wherein said alarm output controller obtains the number of outputs of alarms from each one of said first alarm holding circuit and said second alarm holding circuit, and holds the continuous outputs of one of the first-grade alarm and the second-grade alarm based on the result of a comparison of the obtained number of outputs of alarms from each of the first alarm holding circuit and the second alarm holding circuit.

10. A signal quality monitoring device according to claim 1, said alarm holding section including:
    a first alarm holding circuit for, when a grade of low quality of the current signal shifts from the first grade to the second grade and said first-grade alarm producing/canceling section has canceled the continuous output of the first-grade alarm as a consequence of expiration of the first canceling time period, if said second-grade alarm producing/canceling section discriminates that the current signal is in the second grade of low quality, holding the continuous output of the first-grade alarm regardless of the cancellation by said first-grade alarm producing/canceling section, until said second-grade alarm producing/canceling section produces the continuous output of a second-grade alarm as a consequence of expiration the second producing time period; and
    a second alarm holding circuit for, when a grade of low quality of the current signal shifts from the second grade to the first grade and said second-grade alarm producing/canceling section has canceled the continuous output of the second-grade alarm as a consequence of expiration of the second canceling time period, if said first-grade alarm producing/canceling section discriminates that the current signal is in the first grade of low quality, holding the continuous output of the second-grade alarm regardless of the cancellation by said second-grade alarm producing/canceling section, until said first-grade alarm producing canceling section produces the continuous output of a first grade alarm as a consequence of expiration of the first producing time period.

11. A signal quality monitoring device according to claim 10, wherein said first alarm holding circuit including:
    a first logical OR circuit for outputting a logical sum of a state of the continuous output of the first-grade alarm from said first-grade alarm producing/canceling section and a result of the discriminating in said second-grade alarm producing/canceling section;

a first inverter circuit, connected to said first logical OR circuit, for outputting a first invert of the logical sum received from said first logical OR circuit;

a second logical OR circuit, connected to said first inverter circuit, for outputting a logical sum of the first invert received from said first inverter circuit and a state of the continuous output of the second-grade alarm from said second-grade alarm producing/canceling section; and a second inverter circuit, connected to said second logical OR circuit, for outputting a second invert of the logical sum received from said second logical OR circuit.

12. A signal quality monitoring device according to claim 11, further comprising an alarm output controller for obtaining the total number of outputs of alarms from said first alarm holding circuit and said second alarm holding circuit during a predetermined time period, and for holding, if the obtained total number is equal to or greater than a predetermined threshold value, continuous output of one of the first-grade alarm and the second-grade alarm unless the total number of outputs of alarms from said first alarm holding circuit and said second alarm holding circuit during the predetermined time period becomes smaller than the threshold value.

13. A signal quality monitoring device according to claim 12, wherein said alarm output controller obtains the number of outputs of alarms from each one of said first alarm holding circuit and said second alarm holding circuit, and holds the continuous outputs of one of the first-grade alarm and the second-grade alarm based on the result of a comparison of the obtained number of outputs of alarms from each of the first alarm holding circuit and the second alarm holding circuit.

14. A signal quality monitoring device according to claim 10, wherein said second alarm holding circuit including:

a third logical OR circuit for outputting a logical sum of a state of the continuous output of the second-grade alarm from said second-grade alarm producing/canceling section and a result of the discriminating in said first-grade alarm producing/canceling section;

a third inverter circuit, connected to said third logical OR circuit, for outputting a third invert of the logical sum received from said third logical OR circuit;

a fourth logical OR circuit, connected to said third inverter circuit, for outputting a logical sum of the third invert received from said third inverter circuit and a state of the continuous output of the first-grade alarm from said first-grade alarm producing/canceling section; and a fourth inverter circuit, connected to said fourth logical OR circuit, for outputting a fourth invert of the logical sum received from said fourth logical OR circuit.

15. A signal quality monitoring device according to claim 14, further comprising an alarm output controller for obtaining the total number of outputs of alarms from said first alarm holding circuit and said second alarm holding circuit during a predetermined time period, and for holding, if the obtained total number is equal to or greater than a predetermined threshold value, continuous output of one of the first-grade alarm and the second-grade alarm unless the total number of outputs of alarms from said first alarm holding circuit and said second alarm holding circuit during the predetermined time period becomes smaller than the threshold value.

16. A signal quality monitoring device according to claim 15, wherein said alarm output controller obtains the number of outputs of alarms from each one of said first alarm holding circuit and said second alarm holding circuit, and holds the continuous outputs of one of the first-grade alarm and the second-grade alarm based on the result of a comparison of the obtained number of outputs of alarms from each of the first alarm holding circuit and the second alarm holding circuit.

17. A signal quality monitoring device according to claim 10, further comprising an alarm output controller for obtaining the total number of outputs of alarms from said first alarm holding circuit and said second alarm holding circuit during a predetermined time period, and for holding, if the obtained total number is equal to or greater than a predetermined threshold value, continuous output of one of the first-grade alarm and the second-grade alarm unless the total number of outputs of alarms from said first alarm holding circuit and said second alarm holding circuit during the predetermined time period becomes smaller than the threshold value.

18. A signal quality monitoring device according to claim 17, wherein said alarm output controller obtains the number of outputs of alarms from each one of said first alarm holding circuit and said second alarm holding circuit, and holds the continuous outputs of one of the first-grade alarm and the second-grade alarm based on the result of a comparison of the obtained number of outputs of alarms from each of the first alarm holding circuit and the second alarm holding circuit.

19. A signal quality monitoring device for monitoring quality of a signal received by a transmitter and, when the signal is of low quality, selectively issuing one of a plurality of alarms with different grades in accordance with a grade of low quality of the signal, comprising:

a plurality of producing/canceling sections, associated with the plurality of alarms with different grades respectively, each for successively discriminating whether the current signal is in the corresponding grade of low quality and, when the current signal has stayed in the corresponding grade of low quality for a producing time period, producing continuous output of an alarm of the corresponding grade while, when the result of the discriminating becomes negative and the current signal has stayed off the corresponding grade of low quality for a canceling time period, canceling the continuous output of the alarm of the corresponding grade;

an alarm holding section for, when a grade of low quality of the current signal shifts from one to another of said plural alarms with different grades and said corresponding one of said plural alarm producing/canceling sections has canceled the continuous output of the corresponding one of the plural alarms of the plural grades as a consequence of expiration of the corresponding canceling time period, if the corresponding another of said plural alarm producing/canceling sections except said corresponding one alarm producing/canceling section discriminates that the current signal is in the corresponding another grade, holding the continuous output of the one alarm regardless of the cancellation by said corresponding one alarm producing/canceling section, until said another alarm producing/canceling section produces the continuous output of the corresponding another alarm as a consequence of expiration of the corresponding producing time period.

20. A signal quality monitoring device according to claim 19, said alarm holding section including:

a first alarm holding circuit for, when the current signal shifts in low quality from a higher grade to a lower grade of said plural alarms with different grades and a higher-grade alarm producing/canceling section, which is one of said plural alarm producing/canceling sections corresponding to the higher grade of low quality, has canceled the continuous output of a higher-grade alarm as a consequence of expiration of the corresponding canceling time period, if a lower-grade alarm producing/canceling section, which is one of said plural alarm producing/canceling sections except said higher-grade alarm producing/canceling section and which corresponds to the lower grade of low quality, discriminates that the current signal is in the lower grade of low quality, holding the continuous output of the higher-grade alarm regardless of the cancellation by said higher-grade alarm producing/canceling section, until said lower-grade alarm producing/canceling section produces the continuous output of the lower-grade alarm as a consequence of expiration of the producing time period corresponding to the lower-grade alarm; and a second alarm holding circuit for, when a grade of low quality of the current signal shifts from the lower grade to the higher grade and said lower-grade alarm producing/canceling section has canceled the continuous output of the lower-grade alarm as a consequence of expiration of the corresponding canceling time period, if said higher-grade alarm producing/canceling section discriminates that the current signal is in the higher grade of low quality, holding the continuous output of the lower-grade alarm regardless of the cancellation by said lower-grade alarm producing/canceling section, until said higher-grade alarm producing/canceling section produces the continuous output of the higher-grade alarm as a consequence of expiration of the producing time period corresponding to the higher-grade alarm.

21. A signal quality monitoring device according to claim 20, further comprising an alarm output controller for obtaining the total number of outputs of alarm from said first alarm holding circuit and said second alarm holding circuit during a predetermined time period, and for holding, if the obtained total number is equal to or greater than a predetermined threshold value, continuous output of one of the higher-grade alarm and the lower-grade alarm unless the total number of outputs of alarm from said first alarm holding circuit and said second alarm holding circuit during the predetermined time period becomes smaller than the threshold value.

22. A signal quality monitoring device according to claim 19, further comprising an alarm output controller for obtaining the total number of outputs of alarm from said first alarm holding circuit and said second alarm holding circuit during a predetermined time period, and for holding, if the obtained total number is equal to or greater than a predetermined threshold value, continuous output of one of the higher-grade alarm and the lower-grade alarm unless the total number of outputs of alarm from said first alarm holding circuit and said second alarm holding circuit during the predetermined time period becomes smaller than the threshold value.

23. A signal transmitter communicably connected to a ring network, comprising:

a receiving signal selector for selecting one from two signals, which are identical in contents and which are received by said signal transmitter from two directions of the ring network, based on signal quality information of at least one of the two signals;

a signal quality monitoring section, provided for the at least one signal, for monitoring quality of the at least one signal and, when at least one signal is of low quality, selectively issuing one of two alarms with different grades, as the signal quality information, in accordance with a grade of low quality of the at least one signal, said signal quality monitoring section comprising:

a first-grade alarm producing/canceling section for successively discriminating whether the at least one signal is in a first grade of low quality and, when the at least one signal has stayed in the first grade of low quality for a first producing time period, producing continuous output of a first-grade alarm while, when the result of the discriminating becomes negative and the at least one signal has stayed off the first grade of low quality for a first canceling time period, canceling the continuous output of the first-grade alarm;

a second-grade alarm producing/canceling section for successively discriminating whether the at least one signal is in a second grade of low quality and, when the at least one signal has stayed in the second grade of low quality for a second producing time period, producing continuous output of a second-grade alarm while, when the result of the discriminating becomes negative and the at least one signal has stayed off the second grade of low quality for a second canceling time period, canceling the continuous output of the second-grade alarm; and an alarm holding section for, when a grade of low quality of the at least one signal shifts from one to the other of the first and the second grades and the corresponding one of said first-grade alarm producing/canceling section and said second-grade alarm producing/canceling section has canceled the continuous output of the corresponding alarm as a consequence of expiration of the corresponding canceling time period, if the other of said first-grade alarm producing/canceling section and said second-grade alarm producing/canceling section discriminates that the at least one signal is in the other grade of low quality, holding the continuous output of the one alarm regardless of the cancellation by said one alarm producing/canceling section, until the other alarm producing/canceling section produces the continuous output of the corresponding other alarm as a consequence of expiration of the corresponding producing time period.

24. A signal transmitter communicably connected to a ring network, comprising:

a receiving signal selector for selecting one from two signals, which are identical in contents and which are received by said signal transmitter from two directions of the ring network, based on signal quality information of at least one of the two signals;

a signal quality monitoring section, provided for the at least one signal, for monitoring quality of the at least one signal and, when the at least one signal is of low quality, selectively issuing one of a plurality of alarms with a plurality of different grades respectively, as the at least one signal quality information, in accordance with a grade of low quality of the at least one signal, said signal quality monitoring section comprising:

a plurality of producing/canceling sections, associated with the plurality of alarms with different grades respectively, each for successively discriminating whether the at least one signal is in the corresponding grade of low quality and, when the at least one signal has stayed in the corresponding grade of low quality for a producing time period, producing continuous output of an alarm of the corresponding grade while, when the result of the discriminating becomes negative and the at least one signal has stayed off the corresponding grade of low quality for a canceling time period, canceling the continuous output of the alarm of the corresponding grade;

an alarm holding section for, when a grade of low quality of the at least one signal shifts from one to another of the plural alarms with different grades and the corresponding one of said plural alarm producing/canceling sections has canceled the continuous output of the corresponding one of the plural alarms of the plural grades as a consequence of expiration of the corresponding canceling time period, if the corresponding another of said plural alarm producing/canceling sections except said corresponding one alarm producing/canceling section discriminates that the at least one signal is in the corresponding another grade, holding the continuous output of the one alarm regardless of the cancellation by said corresponding one alarm producing/canceling section, until said another alarm producing/canceling section produces the continuous output of the corresponding another alarm as a consequence of expiration of the corresponding producing time period.

* * * * *